US012560572B2

(12) United States Patent
Torricelli et al.

(10) Patent No.: US 12,560,572 B2
(45) Date of Patent: Feb. 24, 2026

(54) TRANSISTOR-BASED BIOLOGICAL ASSAY SYSTEM COMPRISING MATING RECEPTACLE PLATE AND GATE ELECTRODE PLATE

(71) Applicant: UNIVERSITA' DEGLI STUDI DI BARI ALDO MORO, Bari (IT)

(72) Inventors: Fabrizio Torricelli, Brescia (IT); Luisa Torsi, Bari (IT); Gaetano Scamarcio, Bari (IT); Zsolt Miklós Kovács-Vajna, Brescia (IT)

(73) Assignee: UNIVERSITA' DEGLI STUDI DI BARI ALDO MORO, Bari (IT)

( * ) Notice: Subject to any disclaimer, the term of this patent is extended or adjusted under 35 U.S.C. 154(b) by 794 days.

(21) Appl. No.: 17/788,368

(22) PCT Filed: Dec. 24, 2019

(86) PCT No.: PCT/IB2019/061345
§ 371 (c)(1),
(2) Date: Jun. 23, 2022

(87) PCT Pub. No.: WO2021/130525
PCT Pub. Date: Jul. 1, 2021

(65) Prior Publication Data
US 2023/0036979 A1 Feb. 2, 2023

(51) Int. Cl.
*G01N 27/403* (2006.01)
*B01L 3/00* (2006.01)

(52) U.S. Cl.
CPC ........ *G01N 27/403* (2013.01); *B01L 3/50853* (2013.01); *B01L 2300/0645* (2013.01)

(58) Field of Classification Search
CPC ............ G01N 27/403; G01N 33/5438; G01N 27/4145; B01L 3/50853; B01L 2300/0645; B01L 2300/0663; B01L 2300/0829
See application file for complete search history.

(56) References Cited

U.S. PATENT DOCUMENTS 6,376,233 B1 *  4/2002  Wolf ................... B01L 3/50851
                                               257/253
2006/0057025 A1   3/2006  Eversmann et al.
(Continued)

FOREIGN PATENT DOCUMENTS

WO          2013173754 A1    11/2013
WO     WO-2019145755 A1 *   8/2019    ......... G01N 33/5438

OTHER PUBLICATIONS

Macchia et al., "Single-molecule detection with a millimetre-sized transistor," 2018, Nature Communications, vol. 9, pp. 1-10 (Year: 2018).*

(Continued)

*Primary Examiner* — Luan V Van
*Assistant Examiner* — Kaylee Tseng
(74) *Attorney, Agent, or Firm* — RMCK Law Group PLC

(57) ABSTRACT

A system for biological assay includes a first plate having a plurality of protrusions, a second plate configured for mating with said first plate, the second plate including a plurality of receptacles, each receptacle being configured to receive at least a portion of a corresponding one of said protrusions upon mating of the first plate with the second plate, wherein each protrusion includes a gate electrode configured for facing the respective receptacle upon mating of the first plate with the second plate, and wherein each receptacle further includes at least one source-drain channel operatively asso-
(Continued)

ciated to a gate electrode carried by a respective protrusion upon mating of the first plate with the second plate.

26 Claims, 22 Drawing Sheets

(56)                    References Cited

U.S. PATENT DOCUMENTS

| | | |
|---|---|---|
| 2010/0109637 A1 | 5/2010 | Oleynik |
| 2010/0141280 A1 | 6/2010 | Yang et al. |
| 2013/0056367 A1* | 3/2013 | Martinez ............ G01N 27/4146 |
| | | 205/792 |
| 2016/0041155 A1* | 2/2016 | Takulapalli ........ G01N 33/5438 |
| | | 506/18 |
| 2016/0054312 A1* | 2/2016 | Goldsmith ........... C12Q 1/6869 |
| | | 506/39 |
| 2016/0290958 A1 | 10/2016 | Ram et al. |
| 2017/0363704 A1 | 12/2017 | Wen et al. |
| 2018/0292393 A1* | 10/2018 | Neilson .............. G01N 21/6452 |
| 2018/0328883 A1 | 11/2018 | Ball et al. |
| 2018/0349762 A1* | 12/2018 | Lee ...................... H10D 64/689 |
| 2022/0276195 A1* | 9/2022 | Shalev ............... G01N 27/3273 |

OTHER PUBLICATIONS

Tu et al., "Graphene FET Array Biosensor Based on ssDNA Aptamer for Ultrasensitive Hg2+ Detection in Environmental Pollutants," 2018, vol. 6, pp. 1-9 (Year: 2018).*
International Search Report and Written Opinion dated Sep. 17, 2020. 16 pages.

* cited by examiner

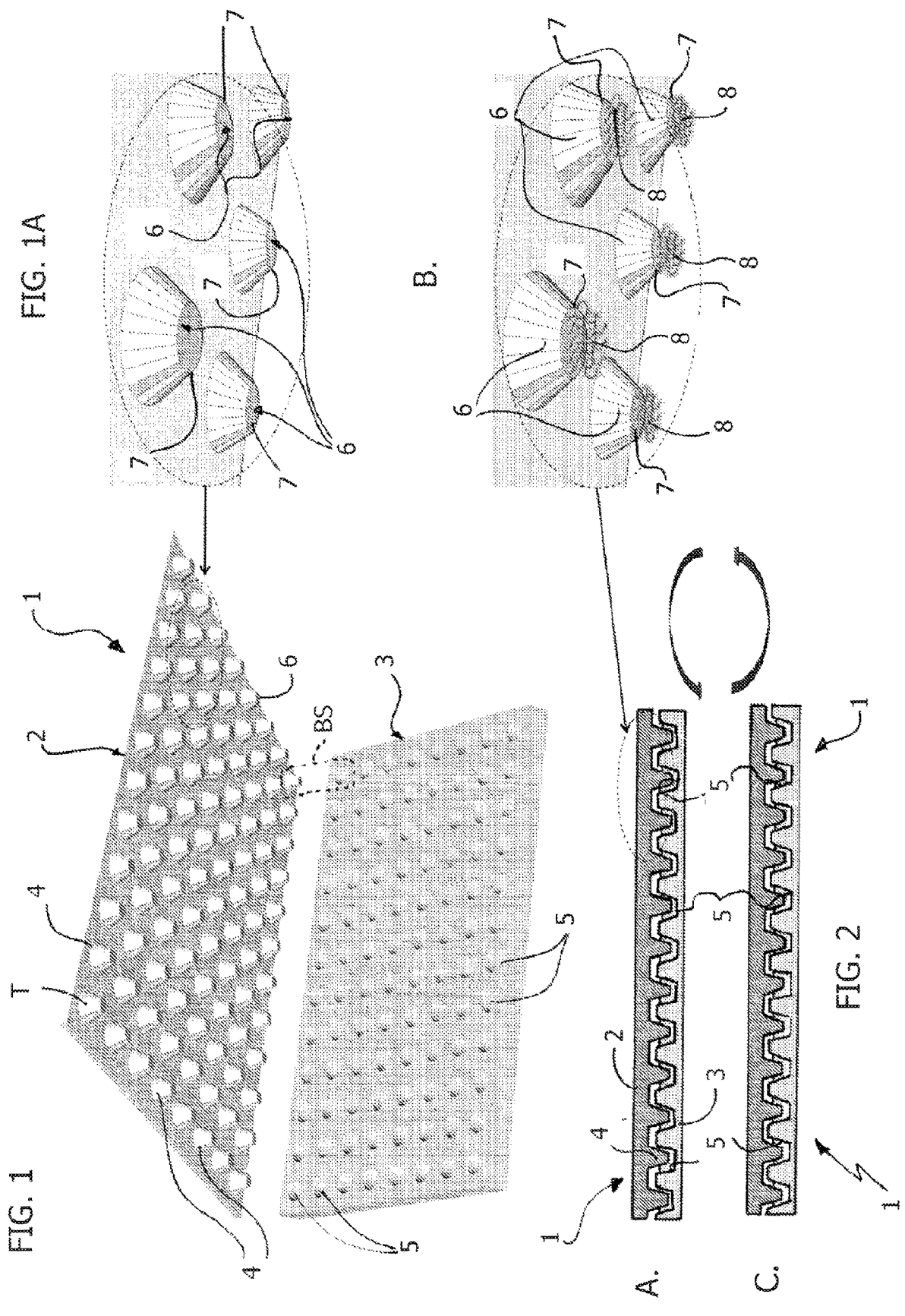

FIG. 8A
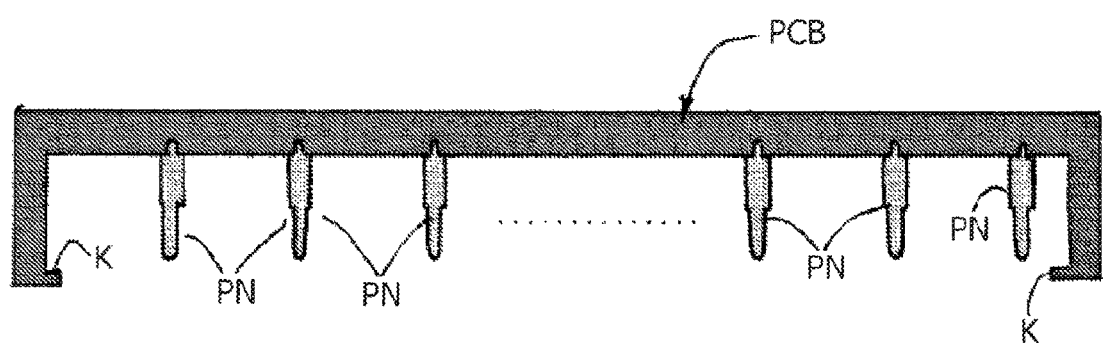
FIG. 8B
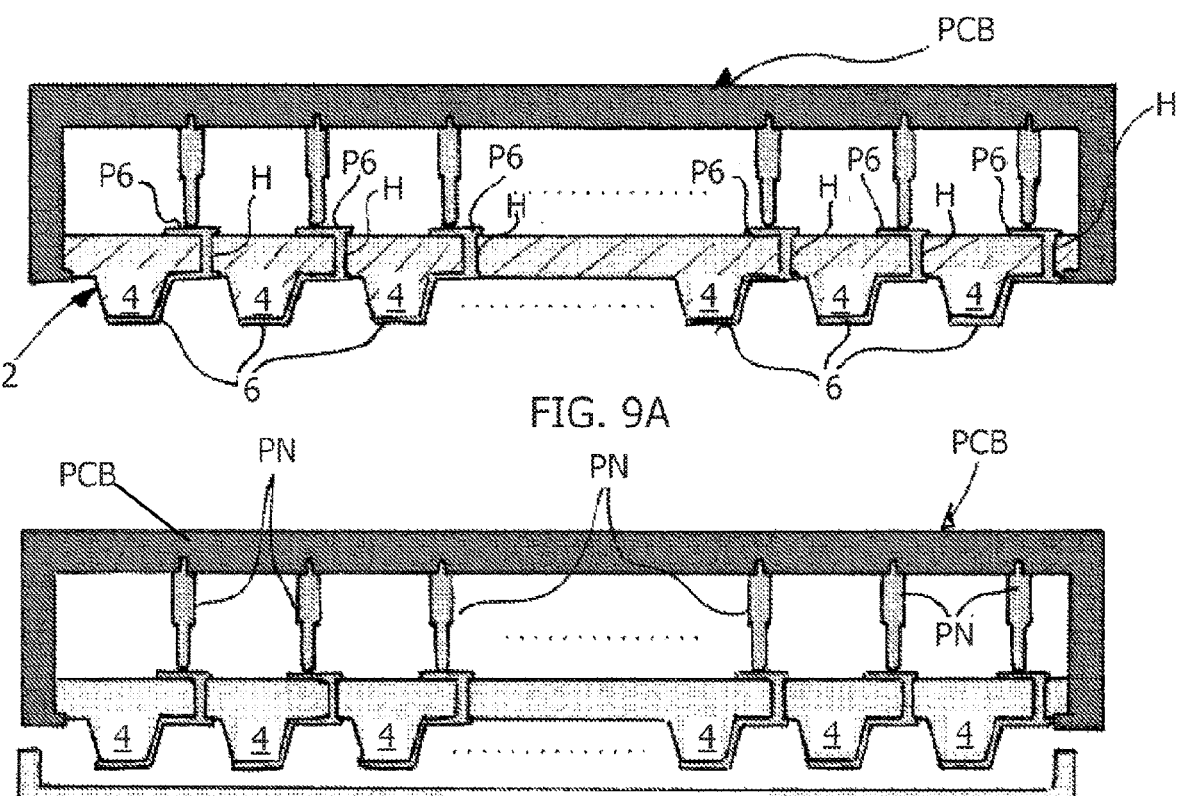
FIG. 9A
FIG. 9B
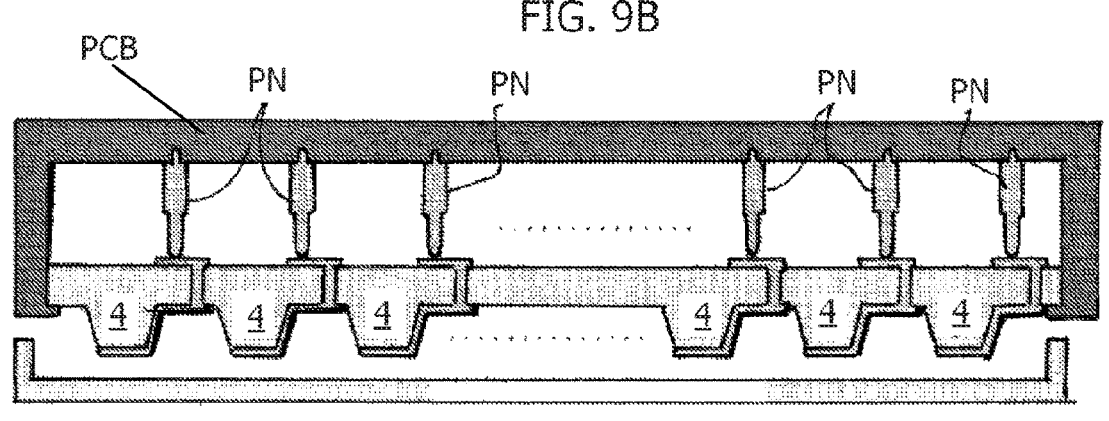

FIG. 19
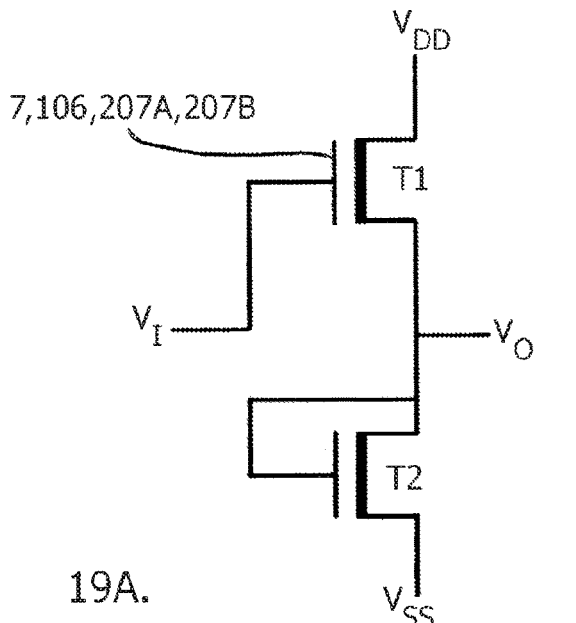
19A.
Unipolar current configuration
T1: p-type | T2: p-type
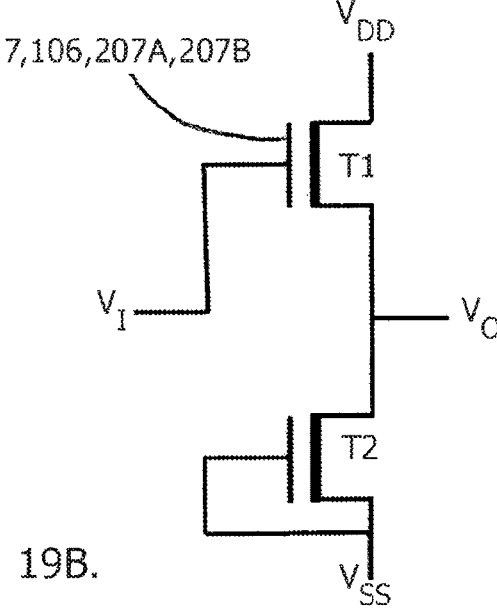
19B.
Unipolar diode configuration
T1: p-type | T2: p-type
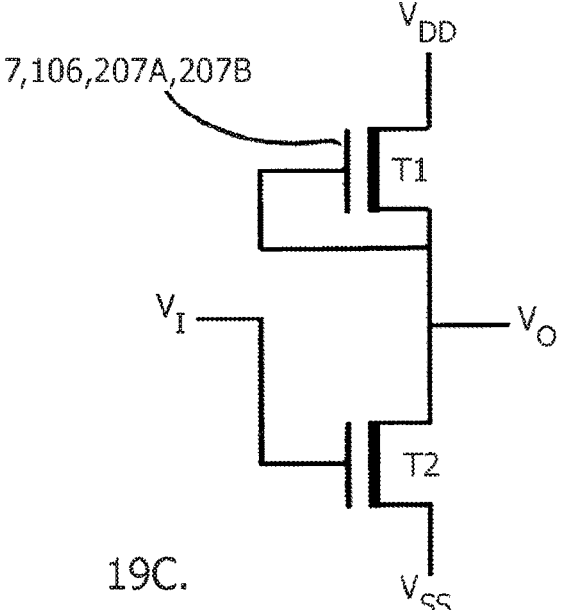
19C.
Unipolar current configuration
T1: n-type | T2: n-type
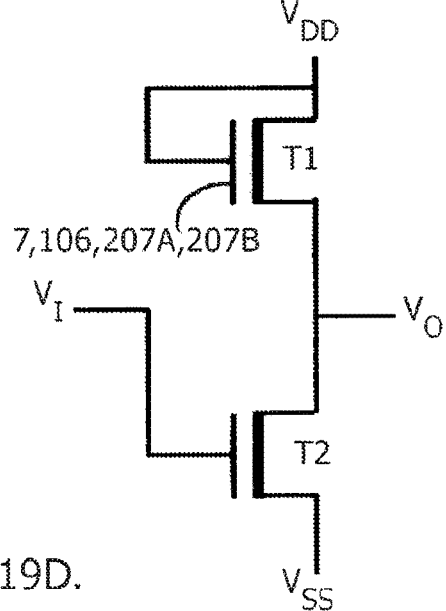
19D.
Unipolar diode configuration
T1: n-type | T2: n-type LEGEND:
CONDUCTOR 1
SEMICONDUCTOR 1
CONDUCTOR 2
INSULATOR
SEMICONDUCTOR 2
ELECTROLYTE GEL

Figure 21:
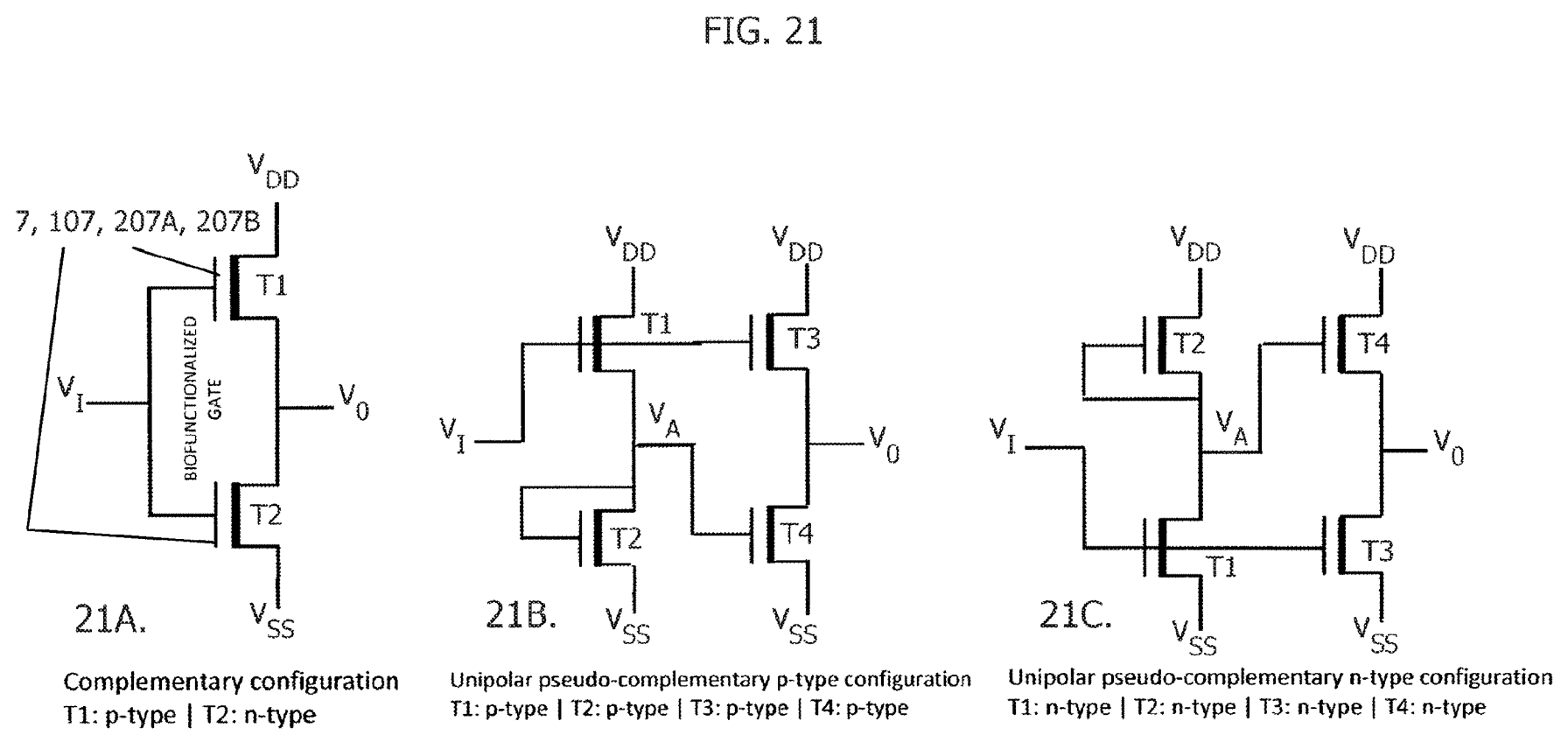

Complementary configuration
T1: p-type | T2: n-type 7, 107, 207A, 207B

21B.

Unipolar pseudo-complementary p-type configuration
T1: p-type | T2: p-type | T3: p-type | T4: p-type

21C.

Unipolar pseudo-complementary n-type configuration
T1: n-type | T2: n-type | T3: n-type | T4: n-type High-amplification low-voltage circuit
T1: p-type or n-type

LEGEND:
▓ CONDUCTOR
▓ SEMICONDUCTOR
▒ INSULATOR

TRANSISTOR-BASED BIOLOGICAL ASSAY SYSTEM COMPRISING MATING RECEPTACLE PLATE AND GATE ELECTRODE PLATE

CROSS-REFERENCE TO RELATED APPLICATION

This application is a 371 National Stage of International Application No. PCT/IB2019/061345 filed Dec. 24, 2019. The disclosure of the above application is incorporated herein by reference in its entirety.

FIELD OF THE INVENTION

The present invention relates to field effect transistor sensors, particularly to field effect transistor (FET) sensors configured as biosensors.

PRIOR ART

In the field of biosensors, and particularly of field-effect transistor biosensors, the search for a sensing system capable of detecting biomarkers at the earliest possible stage of a disease development is gaining momentum as new technologies allow for more and more sensitive and reliable detection systems.

So far, however, the methodological approach has been driven by the idea that miniaturizing the sensing surface of a detector to the lowest possible size would be the way to proceed. Label-free single-molecule detection has been achieved via nano-systems that can incorporate or host, owing to size constraints, very few biological recognition elements.

To actually sense a single biomarker that is dispersed in a large volume of a biological fluid (i.e. a biomarker having an extremely low concentration), the binding events become so highly improbable that a nano-sensor would have to wait for an impractically long time to actually detect a few biomarkers. Accordingly, all of the above detection techniques are inherently unable to track few ligands in a biologically relevant medium as required for instance in biomarkers detection for early diagnosis, wherein the ligand concentration is extremely low in a bio-fluid.

Such nano-systems are also still limited by low reproducibility of the detection events (and the associated results) and production scalability, both being major issues in the transfer of a technological platform into real clinical applications.

Bioelectronics represent one of the most promising directions in printable or low cost production electronics and field effect transistors (FETs). Such devices, that can span dimensions from p m to mm in size, are based on materials such as printable organic semiconductors (OSCs). Among the others, organic FETs, particularly electrolyte gated ones, have been demonstrated to work as highly performing bioelectronic FET (bio-FET) sensors.

While high sensitivity is assured by the FET transduction mechanism, selectivity is achieved by integrating a layer of functional biological recognition elements, directly coupled with an electronic interface. The study of such biological interfaces has provided insights into the conformational changes of the bio-systems serving as biological recognition element, upon direct interaction with the bio-marker to be detected, proving hence to be a label-free, sensitive and selective biosensing technology. FET-based sensors exhibit detection limits down to picomolar ($10^{-12}$ mole $L^{-1}$) and the high repeatability of the sensor responses is characterized by relative standard deviation as low as 3-5% for hundreds of repeated measurements. Up to $10^4$ repeated measurements in sea water were successfully performed with extremely high repeatability (Knopfmacher, Oren and Hammock, Mallory L. and Appleton, Anthony L. and Schwartz, Gregor and Mei, Jianguo and Lei, Ting and Pei, Jian and Bao, Zhenan. Highly stable organic polymer field-effect transistor sensor for selective detection in the marine environment. Nature Communications 5, 2954 (2014)). Moreover, sub-femtomolar ($10^{-15}$ M, fM) detections were achieved with a graphene electrolyte-gated FET modified with human olfactory receptors 2AG1 (Park, S. J., Kwon, O. S., Lee, S. H., Song, H. S., Park, T. H. & Jang, J. Ultrasensitive Flexible Graphene Based Field-Effect Transistor (FET)-Type Bioelectronic Nose. Nano Letters 12, 5082-5090 (2012)). It is important to clarify that, taking into account the volumes of liquids typically analyzed with bio-FETs (100 µL), the number of detected ligands has been so far $10^8$ at pM concentration or $10^5$ at fM concentration, therefore the state-of-the-art in electronic label-free sensing is still very far from single-molecule detection.

The ability of an electrolyte gated FET constituted of a bio-interface that is populated by a large number of biological recognition elements to selectively detect affinity ligands (proteins and biomarkers in general) at the physical limit (e-Single-Molecule-Assay, e-SiMoA), is disclosed and discussed in EP application no. 16207596.4 in the name of the same Applicant.

A drawback of prior art biosensors constituted of a bio-interface that is populated by a large number of biological recognition elements, lies in the de-activation thereof following a single or very few ligand recognition events. In a prior art whenever a ligand recognition event occurs, the resulting local changes associated with a conformational variation, trigger collective phenomena that result in electrostatic and capacitive modifications in the packed receptors layer attached to the gate electrode. When the gate-field is applied, such a change spreads very rapidly to the remaining of the biological recognition layer, thereby causing a signal amplification. This results in the biosensor being extremely sensitive but also rapidly becoming—so to say—"blind" to further ligand recognition events—possibly occurring at different ligand concentrations—as all of the remaining receptors on the gate electrode are deactivated. Such biosensors can in fact act as a sort of "binary" on-off response device, abruptly reaching saturation, to the presence of few ligands.

While such a phenomenon can enable the label-free detection of few proteins with a millimetre size device which is highly relevant per se, but it may prevent the biosensor from having a wide concentration dynamic range. A highly desirable feature would be that of keeping the single-molecule sensitivity of the biosensor but add to it also the ability to detect over a dynamic range at least three orders of magnitude.

These technical problems and the related solutions thereto are discussed in EP application 17177349.2 in the name of the same Applicant.

The inventors have notably observed that in addition to the drawbacks above, FET biosensors with the aforementioned layout and arrangement might still be subject to flaws such as instabilities and therefore detection performances lower than expectations and/or be inherently unsuitable for clustering in an array for use as an assay device. In addition, the state-of-art structures of the FET biosensor are not suitable for the biofunctionalization at an industrial scale and the methods used for the biofunctionalization of the FET bio-sensors arrays are cumbersome and limited to a laboratory environment.

OBJECT OF THE INVENTION

The object of the invention is that of overcoming the technical drawbacks of the prior art.

Specifically, the object of the invention is that of providing a field effect transistor sensor with better stability and hence detection performances, being mechanically and electrically stable, and being additionally suitable for clustering into an array for biological assay.

SUMMARY OF THE INVENTION

The object of the invention is achieved by a system having the features of the appended claims, which form an integral part of the technical disclosure provided herein. A method for the reliable, simple and fast "parallel" biofunctionalization and operation of the FET biosensors array is i.a. disclosed herein.

BRIEF DESCRIPTION OF THE FIGURES

The invention will now be described with reference to the annexed drawings, provided purely by way of non limiting example, wherein:

FIG. 1 is a perspective exploded view of a system according to one embodiment of the invention FIG. 1A is a detail view of a portion of the system in FIG. 1, FIGS. 2A and 2C are sectional views of subsequent stages of biological functionalization of the system of FIG. 1, FIG. 2B is a detail schematic view of a gate functionalization in the system of FIG. 1, FIGS. 3A-3C show three variants of a kit for providing gate electrode contacts in the system according to the invention, FIGS. 5 to 11 show further embodiments of the system of FIG. 1, with FIGS. 8, 9, 10, 11 showing constructional arrangements thereof

DETAILED DESCRIPTION

Figures 3, 4:
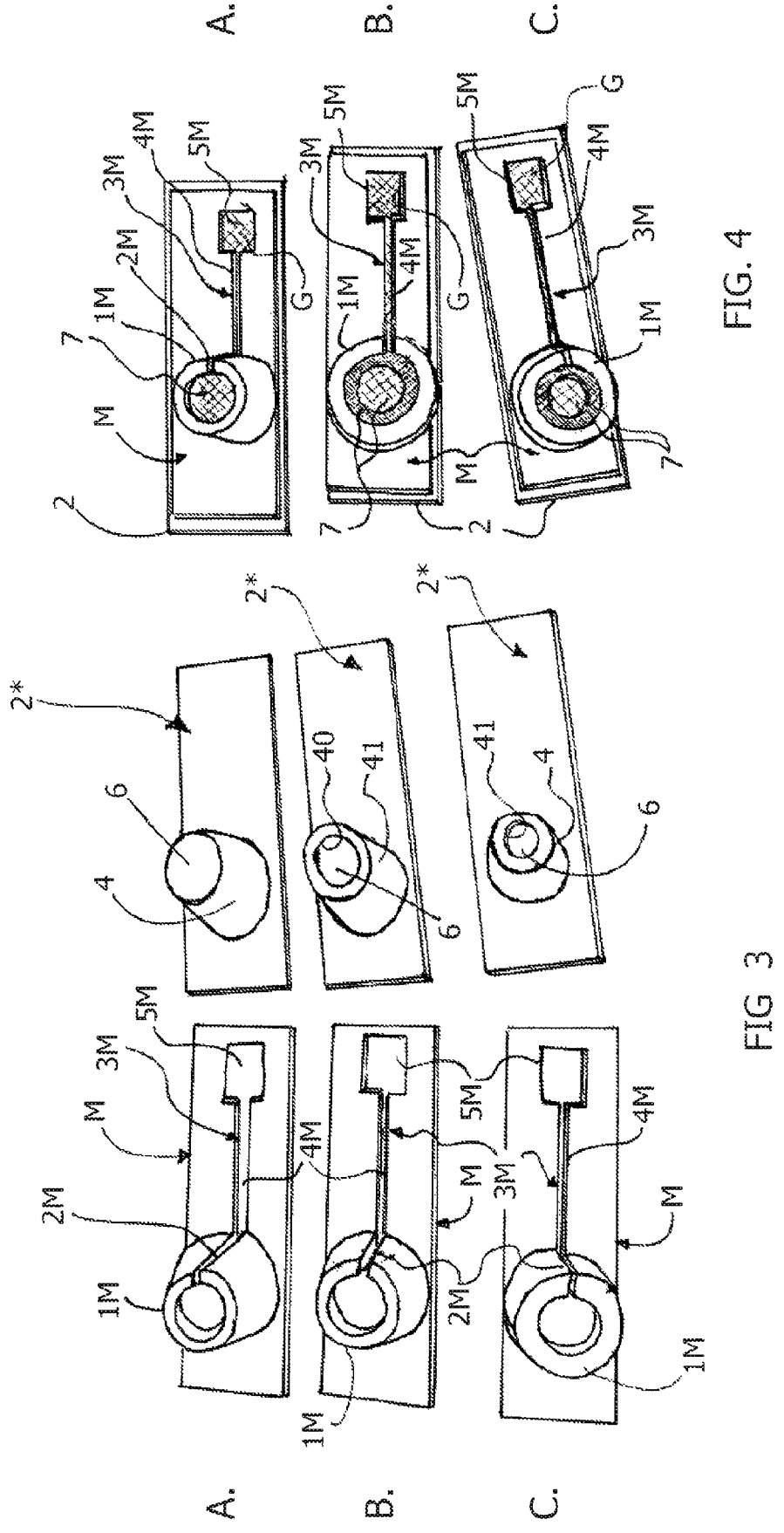
FIGS. 4A-4C show the kits of FIGS. 3A-3C in operation.

Reference number 1 in FIG. 1 designates as a whole a system for biological assay according to a first embodiment of the invention.

In this and further embodiments, the system 1 includes a first plate 2, and a second plate 3, configured for mating with the first plate 2.

The first plate 2 comprises a plurality of protrusions 4, which are preferably arranged in a matrix. In the embodiment shown in the figure, the matrix is a 12×8 array of protrusions 4 having a frustoconical shape.

The second plate 3 comprises a plurality of receptacles 5, each receptacle being configured to receive at least a portion of a corresponding one of the protrusions 4 upon mating of the first plate 2 with the second plate 3. This means that the arrangement of the receptacles 5 is matching and complementary to those of the protrusions 4, so that each receptacle 5 is associated to one—and one only—protrusion 4.

In the embodiment shown in the figure, the receptacle matrix is a 12×8 array of receptacles 5, having themselves a frustoconical shape. Preferably, the second plate may be provided as a conventional ELISA plate wherein the wells thereof provide the receptacles 5.

With reference to FIG. 1A, each protrusion 4 comprises an end surface 6 wherein a gate electrode 7 is provided facing the respective receptacle 5 upon mating of the first plate 2 with the second plate 3.

Accordingly, each receptacle 5 includes at least one source-drain channel, preferably two or more, each comprising an electrically active patterned material. The source-drain channel(s) are operatively associated to the gate electrode 7 carried by the respective protrusion 4 upon mating of the first plate 2 with the second plate 3, and more specifically each gate electrode is configured to be exposed to the at least one source-drain channel of the corresponding receptacle 5.

With reference to FIGS. 3A-3C, as well as FIGS. 4A-4C, an exemplary sequence of operations is shown which may be used to provide electrical contacts on the first plate 2. Purely for the sake of clarity, a subsection 2* of the plate 2 is shown only, with a single protrusion 4.

Gate electrodes 7 and the related electrical contact pads on the plate 2 may be provided by, for instance, deposition of gold patterns (e.g. by sputtering) through a mask fixture M.

The electrode material can be a metal, an organic material such as a polymer and/or a conductive polymer, an inorganic material such as a metal-oxide and/or an amorphous oxide and/or graphene and/or a ceramic material and/or a blend of ceramic and polymeric material.

Each mask fixture M comprises a frustoconical socket 1M, a through slit 2M extending through the wall of the frustoconical socket 1M, and a cutaway 3M which in turn extends through the thickness of the mask fixture M and includes a wire portion 4M and a pad portion 5M.

While the mask fixture M substantially shares the features above—possibly with small variations to adapt to, e.g., different taper requirements or contact printing requirements—the protrusions 4 on the plate 2 may exhibit a variety of shapes at the surface 6. These shapes may range from a flat surface as shown in FIG. 3A, to a slightly recessed surface as shown in FIG. 3B featuring a shallow recess 40 to accommodate a low-thickness gate electrode, and yet further to a deep recessed surface in FIG. 3C, which features a deep recess 41 to accommodate a thick gate electrode.

Operatively, the gate electrodes 7 are printed or deposited by first fitting the mask fixture M onto the plate 2, so that each frustoconical socket 1M fits onto a respective protrusion 4. This means i.a. that the mask fixture M is itself a plate with a matrix array of sockets 1M, slits 2M, and cutaways 3M. The cutaways 3M may also be provided as a network, i.e. with cutaways merging into each other to provide the desired electrical connection pattern between gate electrodes from different protrusions 4.

Once the fixture M is fitted onto the plate 2, gold deposition (or in general electrode and contact deposition) may be initiated. Conductive particles projected onto the mask fixture M—e.g. by sputtering—reach the areas left exposed by the latter (marked with a hatching pattern in FIG. 4), viz. the surface 6, the lateral surface of the frustoconical protrusion 4, and the areas of the plate 2 underlying the cutaway 3M, so as to result in an overall gold pattern wherein the gate electrode 6 is bridged to a contact pad G by means of a wire-like feature generated by the wire portion 4M.

It should be noted anyway that several different techniques may be relied upon for providing the electrodes 7 such as, evaporation, spin coating, and printing. The conductive tracks can be electrically insulated and/or chemically passivated and/or biologically passivated by using organic materials as for example PMMA, resists, PDMA, polyimide, and parylene.

The protrusions 4, as well as the corresponding mask fixtures M can be manufactured by 3D-stereolithographic printing of a photosensitive insulating polymer. 3D-stereolithographic printing may be extended to the entire plate 2, which may be provided accordingly as a fully 3D-printed structure. In this regard, the plate 2 can be manufactured using several technologies as for example 3D printing, 2D-to-3D plastic shaping with cut and fold techniques, and mechanical assembling.

Figures 5, 6, 7:
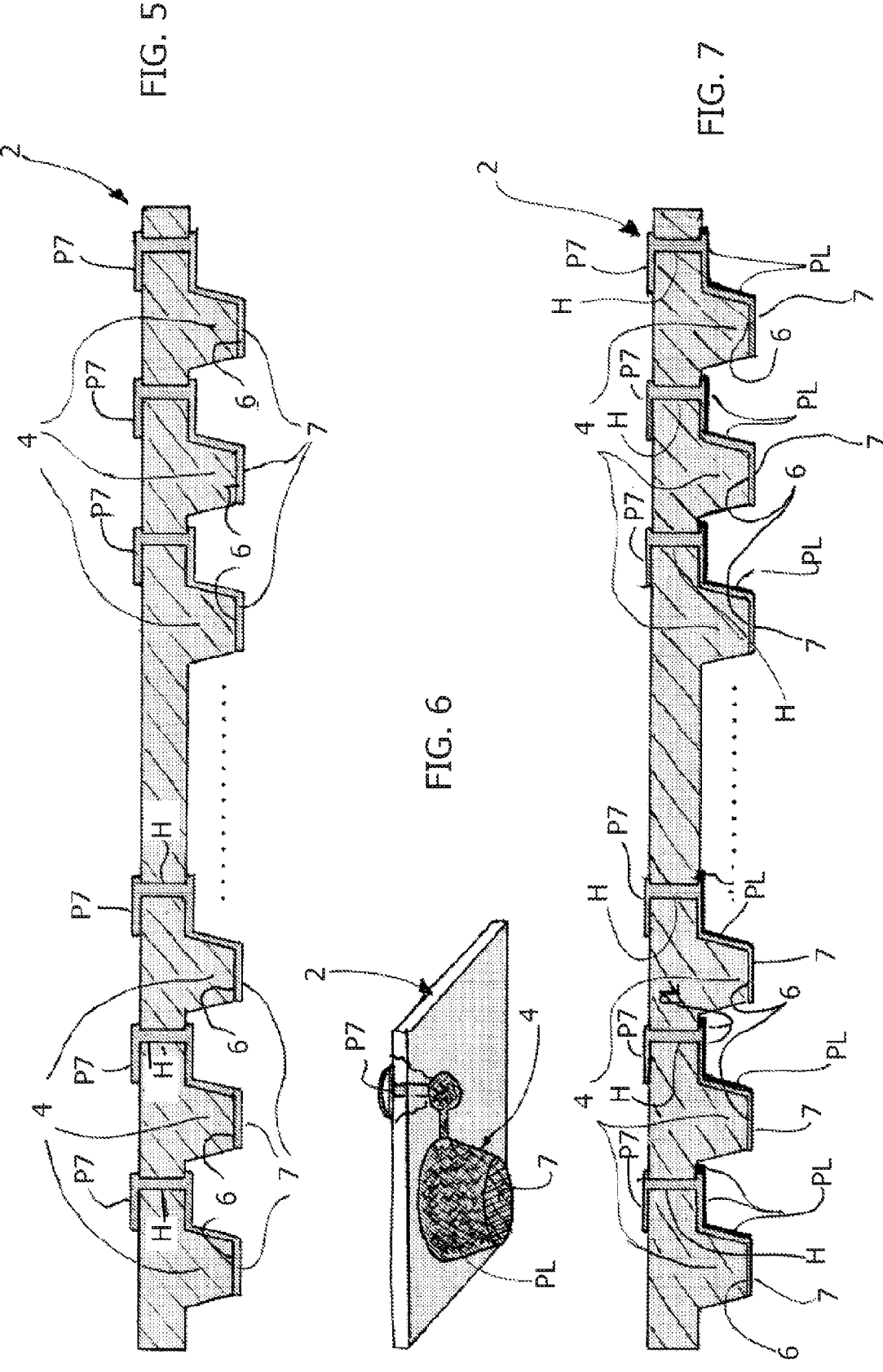

FIG. 5 shows a cross-section of another embodiment of the first plate 2 wherein the gate electrode 7 is connected to a contact pad P7 on the other (opposite) side of the plate 2. The plate 2 can be printed or molded, and subsequently provided with a through hole H next to each protrusion 4 to be then filled by conductive material. Lined dots in between protrusions 4 are meant to indicate the possible provision of further protrusions 4.

This allows establishing an electrical connection to the gate electrode 6, which is provided as a conductive track or pattern deposited on the protrusion side of the plate 2. Specifically, each gate electrode 7 is deposited on the end surface 6 of the frustoconical protrusions 4 and at least partially on the lateral surface thereof as well, so as to electrically connect the portion deposited at the end surface with the conductive material leading out of the through hole H next to the respective protrusion 4, and ultimately with the contact pad P7.

FIG. 6 shows a perspective view of a single protrusion 4 provided with a respective gate electrode 7 arranged as disclosed above in respect of FIG. 5, and additionally provided with a protective layer PL on the lateral surface of the protrusion, above the conductive material of the electrode 7, and at least part of the surface of the plate 2 lying on the side of the protrusions 4, specifically on the conductive material of the electrode 7.

FIG. 7 shows a cross-section identical to FIG. 5, but referred to the embodiment of FIG. 6 and in particular showing the arrangement of the protective layer PL on the gate electrode 7 conductive material.

The protective layer PL is intended to avoid interaction and/or direct contact of the conductive material electrically connected to the gate electrode 7 with the various fluids during functionalization of the gate electrode 7 and during use of the plate 2.

The protective layer PL may be provided by a thin-film material (e.g. a polymer) which is impervious to (i.e. it cannot be penetrated by) the various fluids used during functionalization, biofunctionalization and operation of the plate 2.

Moreover, the protective layer PL has to be inert to the aforementioned fluids, and must not contaminate the various fluids used during functionalization, biofunctionalization and operation of the plate 2.

FIGS. 8A-8B show yet another embodiment of the first plate 2, which retains all of the features of the embodiment of FIG. 5 and is further coupled with a printed circuit board PCB. The printed circuit board PCB may be part of a reading (output) electronic system and it may be re-usable, viz. it is not disposable.

In this embodiment the plate 2—owing to the contact pads P7—is electrically and mechanically connected to the printed circuit board PCB. Particularly, the printed circuit board PCB advantageously includes multiple contact pins PN protruding from the board itself and each configured to contact a corresponding contact pad P7, thereby establishing electrical continuity therewith. Advantageously, the printed circuit board PCB may be provided with coupling features K configured for mating engagement with the plate 2.

The printed circuit board PCB provides electrical track and connection patterns required to electrically operate and/or bias the gate electrodes 7. The gate electrodes 7 can be operated individually as single gates or can be electrically connected together in a set/array of two or more gates or even all of the gates together.

With reference to FIGS. 9A and 9B, the printed circuit board PCB is shown coupled to a first plate 2 both of the type according to FIG. 5 (FIG. 9A) and FIG. 7 (FIG. 9B), featuring the protective layer PL. In FIGS. 9A and 9B the plate 2 is furthermore shown having the gate electrodes 7 immersed in a well containing a fluid. The well may be the second plate 5, as shown by the reference number in the figure.

FIGS. 10A, 10B and FIGS. 11A-C show exemplary embodiments of the plates 2 and 3, specifically of constructional details thereof. It is to be noted that the method and constructions therein are applicable to all of the systems (1, 100, 200) disclosed in this application.

Figures 10A, 10B:
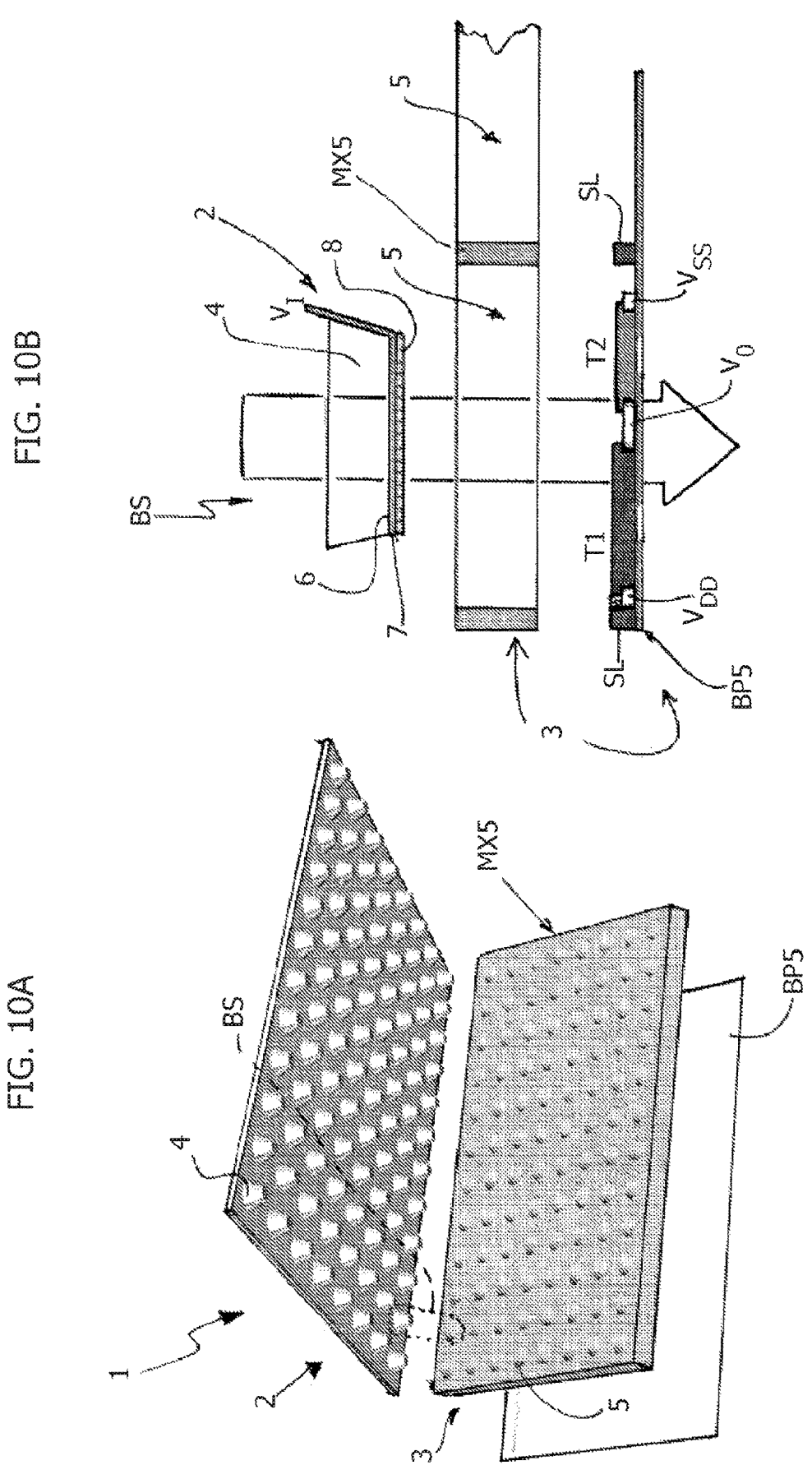

With reference to FIGS. 10A and 10B, the plate 3 may be provided with a two piece structure, namely a matrix MX5 of through receptacles 5 (no top, no bottom) which mates with a board BP5 which bears all of the components, electrical contact pads, electrical connections and such that are required to define the biosensors BS in the system 1, except—of course—the gate electrodes 7 which are carried by the plate 2.

In other words, the board BP5 carries, for each receptacle, at least one source-drain channel operatively associated to a gate electrode 7 carried by a respective protrusion 4 of the first plate 2.

The matrix MX5 of receptacles 5 mates with the board BP5, which has already been printed or subject to deposition processes to provide the relevant transistor electronics thereon, thanks to a sealant layer SL. The sealant layer has a patterns which mirrors the footprint of the receptacles 5 on the matrix MX5, so that when the matrix MX5 is pressed onto the board BP5 the sealant layer is squished under the outline of the receptacles, thereby sealing each receptacle closed (at the bottom). The downwardly pointing arrow in FIG. 10B is representative of the assembly direction.

Figures 11A, 11B, 11C:
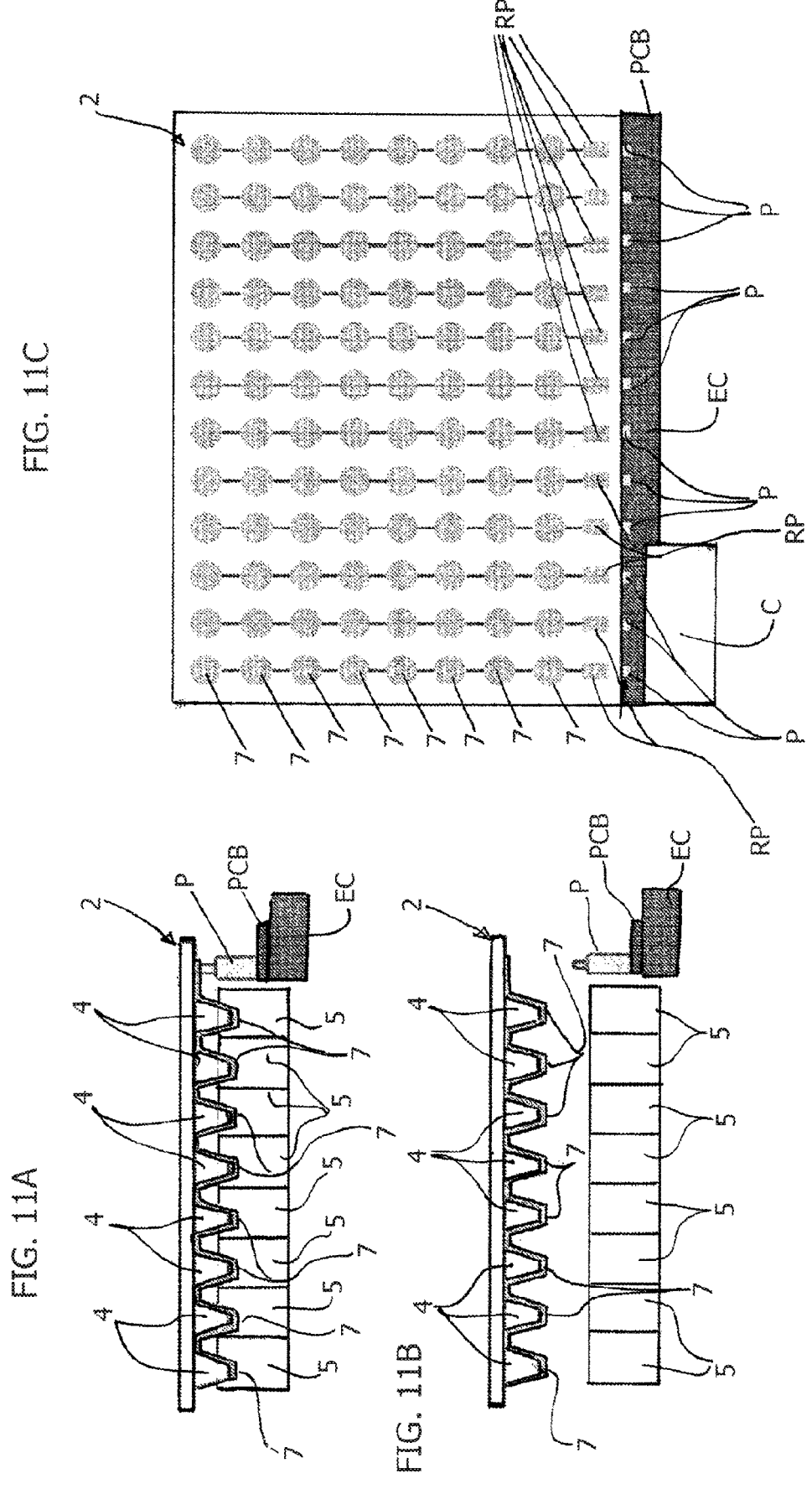

With reference to FIGS. 11A-11B, an exemplary structure of the plate 2 is shown therein. Identically to the plate 3 of FIGS. 10A-10B, the plate 2 is a 12 (rows)×8 (columns) matrix of protrusions 4, each carrying a respective gate electrode 6 on the surface 7. The conductive tracks may be advantageously covered by the protective layer PL as disclosed in the foregoing. The gate electrodes 7 are column-wise series connected, i.e. they are series connected in groups of eight electrodes. The conductive track between adjacent column pads in FIG. 11B is representative of the electrical connection. Each column series terminates with a read-out contact pad RP configured to contact a read out pin P protruding off a printed circuit board PCB, in turn carried by or coupled to a read-out electronic equipment EC.

More in general, the read out pad RP is configured for contacting a read out terminal—which can be the pin or other type of electrical terminal, for instance slot-type terminals such as those formerly used in personal computer motherboards for plug-in video or audio cards—of a read out electronics facility.

The equipment EC may be provided with a cable connector C for interface with external units such as personal computers, laptops, monitors, etc.

Turning back to FIGS. 2A-2C, once the gate electrodes 7, as well as the respective electrical connection pattern(s), are provided on the protrusions 4 and the plate 2 overall, the gate electrodes 7 are subject to functionalization by addition of a layer of biological recognition elements comprising one or more specific binding pair forming substances. The layer of biological recognition elements is exposed the one or more source-drain channel(s) of the receptacle 5 thereof upon mating of the first plate 2 and the second plate 3, thereby defining a biosensor BS. Accordingly, the receptacle 5 is configured for receiving a gating electrolyte for operation of the biosensor BS, wherein the gating electrolyte may include a solution containing one or more species or substances to be detected by the biosensor BS.

An exemplary method of functionalization of the gate electrodes 7 is disclosed in PCT application no. PCT/IB2017/058065. Selected details of this functionalization technique will be mentioned explicitly in the following for the sake of completeness. Additionally, the layer of biological recognition elements may be provided as disclosed in PCT application no. PCT/IB2018/053611, i.e. patterned into a plurality of uncoupled domains.

The surface of the gate electrode 7 is bio-functionalized by forming a layer of biological recognition elements thereon. Said layer of biological recognition elements includes one of:

a complex of a chemical self-assembled structure and a biological self assembled structure of one or more specific-binding-pair-forming substances, wherein the biological self-assembled structure is chemically grafted onto the chemical self assembled structure, or a biological self assembled structure of one or more specific-binding-pair-forming substances, wherein the structural units of the biological self assembled structure are treated to exhibit grafting properties in respect of the substrate they are intended to graft on i.e. the surface of the gate electrode 7.

In a preferred embodiment, the layer of biological recognition elements includes a chemical self assembled monolayer (chemical SAM, C_SAM in the figures) and a biological self-assembled monolayer (biological SAM, B_SAM in the figures) of one or more specific-binding-pair-forming substances.

The one or more specific-binding-pair-forming substances include one or more of the following:

antibodies (one or more) against a selected bio-marker,
    anti-human Immunoglobulin (anti-hIG) antibodies,
    anti-human Immunoglobulin G (anti-IgG) antibodies, anti-human Immunoglobulin M (anti-IgM) antibodies,
    specific-binding-pair-forming substances for dopamine, chiral odors, DNA, human glycoprotein, inflammatory cytokines, C-reactive proteins.

In embodiments only featuring a biological self assembled structure, the same is a self assembled monolayer of one or more specific-binding-pair-forming substances with a thiol group able to spontaneously attach to the gold surface such as, but not limited to, proteins modified in such a way as to have an exposed cysteine. Direct physical adsorption of capturing proteins is also considered.

In the preferred embodiment, the gate electrode functionalization method according to the invention provides that a SAM layer of anti-human Immunoglobulin G (anti-IgG, preferred) or anti-human Immunoglobulin M (anti-IgM) antibodies be added covering the whole gate surface, and specifically be grafted onto a chemical SAM layer applied to the surface of the gate electrode 7 to be functionalized. Clearly, the invention can be practiced with other specific-binding-pair-forming substances (e.g. a selected antibody for a target biomarker).

The protein SAM deposition procedure is general as it does not depend on specific features (such as for instance functional groups) that are characteristics solely of the antibodies. This renders the deposition method extendable i.e. to all of the biological species mentioned above (all the antibodies, PNA, human glycoprotein, or protein receptors for dopamine, chiral odors, inflammatory cytokines, C-reactive proteins, HIV). This is an essentially general platform for immunoassay.

According to the invention, the one or more specific-binding-pair-forming substances (such as for instance anti-hIg, anti-IgG, anti-IgM but also antibodies in general) immobilized in the layer of biological recognition elements (particularly in the biological SAM) are packed at a density comprised between $0.1\times104$ μm-2 and $10\times104$ μm-2, preferably between $1\times104$ μm-2 and $2\times104$ μm-2.

When the gate electrode 7 is provided as a thin film electrode, such as for instance as provided via the mask fixture M, this gate is directly processed for bio-functionalization starting from the exemplary method steps described in the following.

After the flame annealing or the electrochemical polishing of the gate electrode, or directly for the gate made of a thin-film of gold, in the preferred embodiment the chemical SAM layer is added to the gate electrode 7 by means of a precursor consisting of a layer of alkanethiols terminating with carboxylic functionalities, which is deposited on the surface 9.

To this end, a 10 mM solution consisting of 10:1 ratio of a 3-mercaptopropionic acid (3-MPA) to 11-mercaptoundecanoic acid (11-MUA) was prepared in ethanol grade, puriss. p.a. assay, ≥99.8.

The cleaned gold platelet was immersed in the 3-MPA and 11-MUA solution and kept in the dark (i.e. in the absence of visible and UV light) under constant gaseous nitrogen (N2) flow for eighteen (18) hours at 22° C.

The inventors have however observed that, in addition to the preferred parameters above, the same step can be practiced with a solution having a concentration in the range 10 mM to 100 mM, consisting of a 10:1 to 1:1 ratio of a 3-mercaptopropionic acid (3 MPA) to 11-mercaptoundecanoic acid (11 MUA) in ethanol grade, but also composed by the sole 3-mercaptopropionic acid, and immersing the gate electrode 6 therein for a residence time comprised between 15 and 20 h and at a temperature of 15 to 24° C.

The strong gold-sulfur interaction results in the exposure of the carboxylic groups, activated subsequently by reacting the partially processed gate electrode as per the above in a 200 mM 1-Ethyl-3-(3-dimethylaminopropyl)carbodiimide (EDC) and 50 mM sulfo-N-Hydroxysuccinimide (sulfo-NHS) aqueous solution for two (2) hours at 25° C.

Again, the inventors have however observed that, in addition to the preferred parameters above, the same step can be practiced by reacting the gate electrode 6 in a 50 mM to 250 mM 1-Ethyl-3-(3-dimethylaminopropyl)carbodiimide (EDC) and 50 mM to 250 mM sulfo-N-Hydroxysuccinimide (sulfo-NHS) for a residence time comprised between 10 minutes and 3 h and at a temperature of 22 to 26° C. An N-Hydroxysuccinimide (NHS) aqueous solution can be used instead of the sulfo-NHS one.

In the preferred embodiment, the anti-human Immunoglobuline G (anti-IgG) or the anti-human Immunoglobuline M (anti-IgM) SAM layer (biological SAM) is thus generated through the anchoring of the antibodies (or generally of the specific-binding-pair-forming substance) to the chemical SAM, specifically to the carboxy groups linked to the sulfo-NHS or to the NHS moieties resulting from the chemical activation described in the previous paragraph, by immersing the gate electrode 7 in a Phosphate Buffered Saline (PBS) solution containing the antibodies for two (2) hours at 25° C.

According to the invention, the Phosphate Buffered Saline (PBS) solution may consist of 0.1-1 mg ml-1 of antibodies such as, but not limited to, anti-IgG or anti-IgM and 5 mM to 25 mM of phosphate buffer having a pH in the range 5 to 8 and a physiologically relevant ionic strength in the range 10 mM to 200 mM.

In the preferred embodiment, the solution consists of 0.7 µM (0.1 mg ml-1) of antibodies in PBS made by 10 mM phosphate, KCl 2.7 mM and 137 mM NaCl having a pH of 7.4 and a ionic strength of 162 mM.

Once again, the inventors have however observed that, in addition to the preferred parameters above, the same step can be practiced by immersing the gate electrode 6 in a buffer solution comprising anti-IgG antibodies or anti-IgM antibodies (other antibodies in general), wherein the buffer solution comprises one of:

Na phosphate buffer solution of Dulbecco's phosphate buffered saline (D-PBS, KCl: 2.7 mM, NaCl: 136 mM, KH2PO4: 1.5 mM, Na2HPO4: 8.1 mM)

Phosphate buffer solution 20 mM and pH 8 for a residence time comprised between 15 min to 3 h and at a temperature of 23 to 26° C.

Moreover, the antibody solution (anti-IgG, or the anti-IgM for example) shall have optimal pH and ionic strength depending on the source of antibodies.

Suitable pH values are in the range from 5 to 9 and ionic strength from 10 mM to 200 mM.

Other buffers that can be used to practice the method according to the invention include (depending on the desired pH value): Tris-HCl, phosphate, citrate, imidazole-Cl, PIPES, ACES MOPSO, BES, TES, MOPS, DIPSO, TAPSO, HEPPSO, POPSO, TEA, EPPS, Tricine, Glycine, Bicine, HEPBS, TAPS, AMPD, Borate.

The ionic strength can be adjusted by any salt that does not interfere with the covalent attachment of the antibody to the gate and with the native conformation of the antibody. Commonly used salts are NaCl and KCl.

Alternatively, the following protocols can be used to attach different biological recognition elements that will endow the biosensor BS (specifically when the same is embodied as an EG-OFET) of a good degree of selectivity. Namely, for instance:

a SAM from cystamine 1 mM aqueous solution with subsequent covalent immobilization of 4-formylphenylboronic acid saturated in 1,4-dioxan at 40° C. for 2 h to detect dopamine.

The physical adsorption of: histidin-tagged protein G (5 mg/mL) in PBS (100 mM of PBS, pH 7.4) to attach IL4 monoclonal antibody (0.25 mg/mL anti-IL4) for 1 h at 5° C. to detect interleukin-4.

A SAM functionalization: 50 mM solution of 3-mercaptopropionic acid (3 MPA) in ethanol containing 5% acetic acid under nitrogen, in the dark for 18 h at 22° C. Activation: 100 mM EDC and 200 mM NHS aqueous solution for 1 h at 25° C. Covalent immobilization of odorant binding proteins, pOBPs, (0.7 mg ml-1 in 20 mM Na phosphate buffer, pH 8.0), 2 h at 25° C., to detect chiral odors such as carvone.

Covalent immobilization: reduced thiolated ssDNA-probes (7 pmol/cm2), on floating gate electrode in Tris buffer (10 mM Tris, 1 mM EDTA, pH 8.0) at 0.1 M NaCl for 2 h. Rinsed with Tris without NaCl.

SAM: 10-carboxy-1-decanethiol (1 mM in hexane) 1 h, room temperature. Washing with ethanol and water. Activation: 5 µl 2-morpholino-ethane-sulfonic acid buffer solution (MES, 100 mM, pH 6.0) containing 5 mM sulfo-NHS, N,N'-di-isopropyl-carbodiimide (DIC, 40 mM) and sodium chloride (500 mM), 15 min. Covalent immobilization: Streptavidin (500 µg/ml) in 5 µl of a carbonate buffer solution (Na2CO3: 15 mM, NaHCO3: 35 mM, pH 9.6) on electrode, 15 min. Physical adsorption: immersion in D-PBS containing 0.05 wt. % Tween 20, 0.1 wt. % BSA, 15 min.

SAM: 5-carboxy-1-pentanethiol. Activation: 5 µl 2-morpholino-ethane-sulfonic acid buffer solution (MES, 100 mM, pH 5.5) containing 5 mM sulfo-NHS, DIC (40 mM), 15 min. Covalent immobilization: Streptavidin (500 µg/ml) in 5 µl of a carbonate buffer solution (Na2CO3: 15 mM, NaHCO$_3$: 35 mM, pH 9.6) on electrode, 2 h, room temperature. Physical adsorption: immersion in D-PBS containing 0.05 wt. % Tween 20, 0.1 wt. % human serum albumin (HMS), 15 min. Incubation in biotin-tagged anti-CgA antibody (30 µg/mL) with 0.1 wt % HSA PBS solution, 30 min, room temperature.

Once the anti-IgG or the anti-IgM SAM B_SAM is set in place there is the need to "block" the bio-functionalised layer (this applies to whatever specific-binding-pair-forming substance the SAM is made of). Specifically, the layer of biological recognition elements on the gate electrode 7 is treated with a solution containing one or more blocking agents to fill vacancies and prevent nonspecific binding in the self-assembled structure.

In the preferred embodiment, this is performed via saturation of the unreacted activated carboxy groups of the functionalized chemical SAM layer, particularly by means of concentrated solutions of amines for a time long enough to allow the reaction with all the activated carboxylic groups (usually from 30 min to few hours). The amines can be supplied as additive in a buffer (such as ethanolamine 1 M in PBS) or can be the rinsing buffer itself (such as Tris). The inventors identified this step as instrumental to the formation of the hydrogen-bonding network of the chemical SAM layer, which enables the collaborative effect at the basis of the first-stage amplification of single-molecule biorecognition event.

To this end the anti-IgG or anti-IgM layer in the preferred embodiment is treated with ethanolamine 1 M in PBS for one (1) hour at 25° C. In this case the ethanolamine combined with the 3-MPA chem-SAM forms the aforementioned hydrogen-bonding network.

Finally, the bio-functionalized gate electrode 7, particularly the layer of biological recognition elements thereof, is immersed in a 1.5 µM (0.1 mgml-1) BSA (Bovine Serum Albumine) solution in PBS 10 mM for one (1) hour at 25° C. Therefore, in the preferred embodiments ethanolamine and BSA are used as blocking agents.

The inventors have however observed that the blocking step can be practiced by immersing the bio-functionalized gate electrode 7, particularly the layer 9, in a 0.05 to 1 mg ml-1 BSA solution in buffer at pH-7.4 composed by phosphate 5 mM to 20 mM and at ionic strength ranging from 80 mM to 350 mM for a residence time comprised between 30 min and 2 h, and at a temperature comprised between 22° C. and 26° C.

Alternatively, other blocking agents include Human Serum Albumin (0.01-3% W) Tween 20, casein or 1 mM 6-mercaptohexanol (MCH), 2-aminoethanol (1 M) in 5 µl of Dulbecco's Phosphate Buffered Saline (D-PBS, KCl: 2.7 mM, NaCl: 136 mM, KH2PO4: 1.5 mM, Na2HPO4: 8.1 mM). The exposure (residence time) to these solutions can vary from 15 minutes to 3 hours.

The "surface blocking" step as described above is generally carried out to minimize the non-specific binding. The inventors have also noted that, when performed in a method according to the invention, such a step can also drastically improve the sensitivity of the biosensor BS. The molecules used to "block the surface" minimizes non-specific adsorption of biomolecules to the gate electrode areas that are not fully covered by the anti-IgG or the anti-IgM (or more in general by antibody proteins). Additionally, the BSA may also work as—so to say—a mechanical and electrostatic coupler for the biological self assembled structure.

According to an advantageous aspect of the invention, the matrix array pattern of the plate 2 allows the gate electrodes thereon to be functionalized by performing the relevant steps (e.g. incubation in a buffer solution, washing, etc.) in a functionalization facility having a structure identical to that of the plate 3. An example of such a facility can be embodied as a conventional ELISA plate wherein the wells are used to receive a corresponding protrusion 4 with the gate electrode 7 already provided thereon, and all the relevant functionalization steps may be performed by mating of the first plate 2 to the functionalization ELISA plate, as shown schematically in FIGS. 2A-2C. FIG. 2A is representative, for instance, of an incubation step in a buffer solution, FIG. 2B is representative of the attachment of a layer of biological recognition elements 8 to the surface of the gate electrode 7, and FIG. 2C is representative, for instance, of a washing step. The steps of FIGS. 2A, 2C may be repeated multiple times depending on the functionalization protocol.

Figures 12, 13, 14:
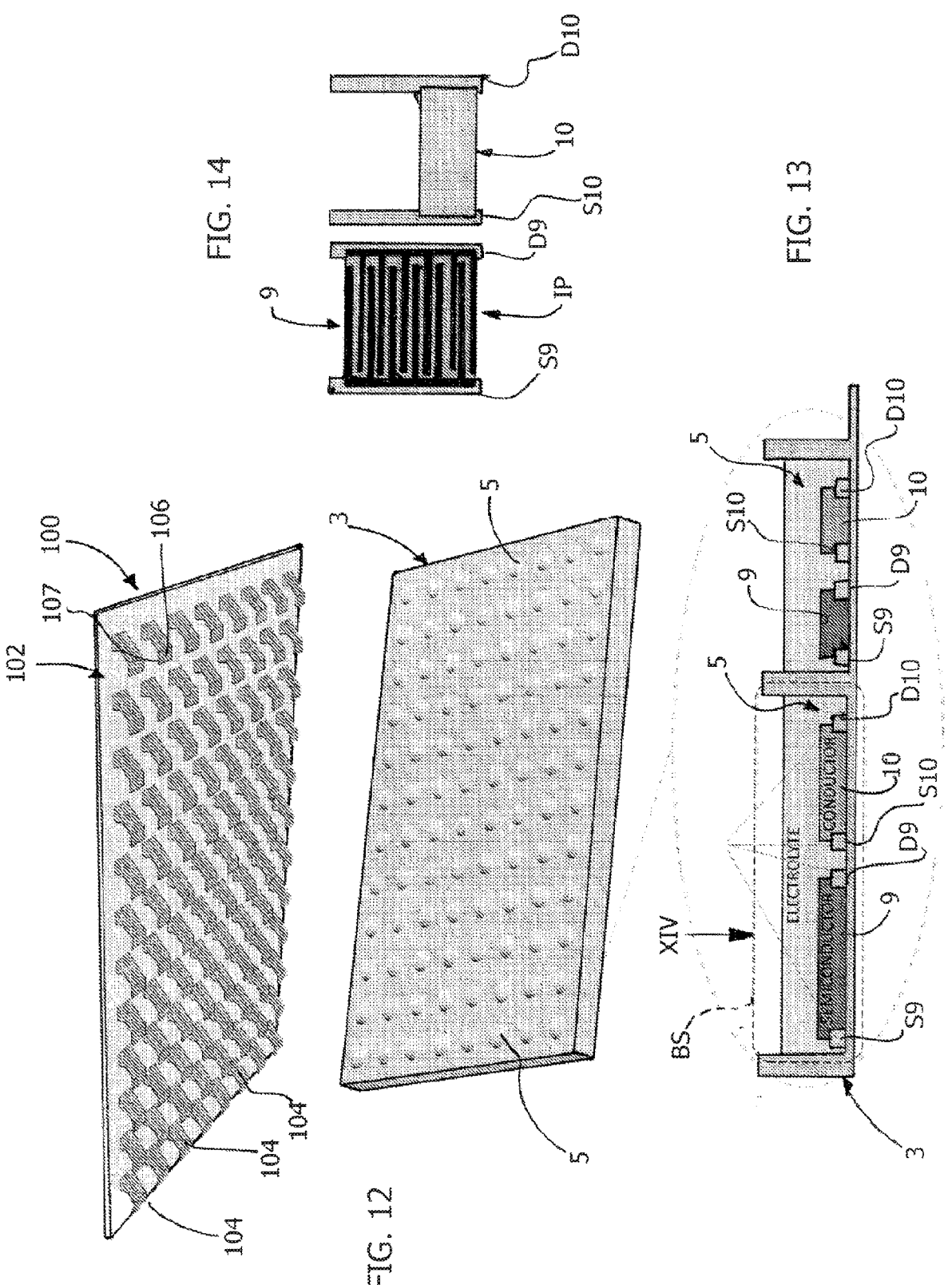
FIG. 12 shows a further embodiment of the system according to the invention.
FIG. 13 shows a schematic cross-sectional view of a portion of the system of FIG. 12.
FIG. 14 shows a schematic plan view according to arrow XIV in FIG. 13.

FIG. 12 shows a first plate 102 in a second embodiment of the system of the invention, numbered 100. In this embodiment, the plate 102 is made from a plastic substrate whereon a plurality of protrusions 104 are provided as metal (or in general electrically conductive) foil members sticking out of the surface of the plate 102. Each foil member features an end surface 106 which itself provides a gate electrode.

The protrusions 104 with the gate electrodes 106, the electrical interconnections among the gate electrodes from different protrusions, electrical contact pads and other possible geometrical elements are deposited and patterned on a metal substrate (or otherwise conductive deformable substrate).

Standard industrial methods compatible with large area and mass-production processes like photolithography, printing and/or laser writing can be used.

The metal or otherwise conductive substrate is then cut according to desired geometries, for example the desired area and protrusion of the gate electrodes (distance of surface 106 from the plate 102). As a next step, the cut metal or otherwise conductive substrate is folded and/or bent by using, for example, a thermal process involving the application of pressure against a mold or a die.

To ensure the desired electrical connection pattern of the electrodes upon the above forming process, a printing step of a conductive material can be used to restore the connections in some critical areas, such as for example hinge points at which bending or folding occurs.

Functionalization of the gate electrode 106 surfaces is performed according to the techniques disclosed in respect of the gate electrodes 7. The conductive tracks and areas (excluding the gate electrodes) can be electrically insulated and/or chemically passivated and/or biologically passivated by using organic materials as for example PMMA, resists, PDMA, polyimide, and parylene or by using oxides as for example TiO2, SiO2, AlO2, SiNx.

FIGS. 13 and 14 are exemplary of the features of the second plate 3, specifically of the receptacles 5 thereof, in the embodiments of the invention disclosed herein. The disclosure applies both to the system 1, and to the system 100, as well as to any other embodiment disclosed herein.

In general, the receptacles 5 of the second plate 3 define wells hosting one or more source-drain channels, preferably two or more, each featuring an electrically active (conductive and/or semiconductive) patterned material, wherein the wells are configured for being filled with a liquid and/or a gel and/or a mixture containing ions. By the way of example, the liquid could be water, a body fluid, or more in general a liquid or gel electrolyte, a liquid salt or a mixture of salts.

For example, each of the receptacles 5 may contain, on an end (bottom) wall thereof, two electrically active patterned materials including a semiconductor material 9, for example P3HT, and a conductor material 10, for example a conductive polymer like PEDOT:PSS or an inorganic conductor like graphene. Each of the electrically active patterned materials is associated to electrical source and drain contacts S9, D9 and S10, D10 respectively. When a semiconductor is used, the latter is stacked on top of an interdigitated electrically conductive pattern IP (FIG. 14).

In alternative, the electrically active patterned materials may include two patterned semiconductors with different capacitance. The advantage of this latter arrangement will be detailed in the following.

The electrically active patterned materials 9, 10 can be connected to corresponding electrically active patterned materials in other receptacles 5 and/or to external electronic devices by means of conductive electrodes and/or conductive paths deposited on the second plate 3.

Figure 15:
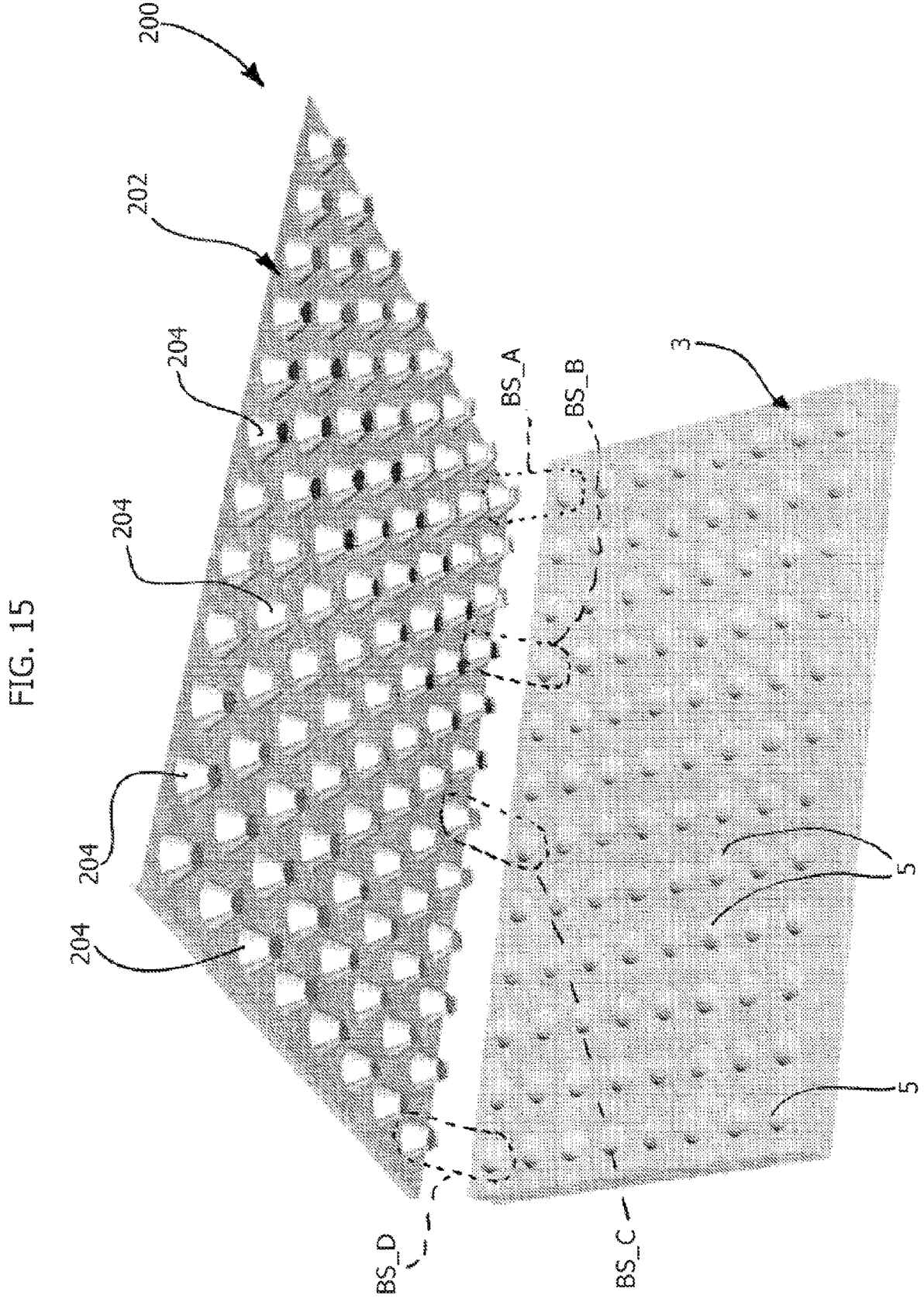
FIG. 15 shows yet a further embodiment of the system according to the invention.

With reference to FIG. 15, yet another embodiment of the assay system according to the invention is designated by reference number 200. The system 200 is overall identical to the system 1—and in particular may be practiced as a variant thereof—as it only differs therefrom in that the gate electrodes are functionalized differently over the matrix array. That is, the plate 202 comprises protrusions 204 having an end surface 206 whereon a gate electrode 207 is provided, preferably according to the techniques disclosed in the foregoing.

The gate electrodes 207 are functionalized by provision of a layer of biological recognition element which is specific to each of the protrusions 204, or to groups of protrusions 204. In other words, each gate electrode 207 is functionalized so that the specific-binding-pair-forming substance differs from electrode to electrode (in this case each electrode is electrically insulated from other electrodes) or among different groups of electrodes.

This is identified in FIG. 15 by the marking of the biosensors with an additional reference namely biosensors (groups) BS_A, BS_B, BS_C, BS_D, just by way of example. Additionally, this is identified in FIG. 9 by marking two adjacent gate electrodes as 207A and 207B (e.g. belonging to biosensor group BS_A and BS_B), to bear witness to the different functionalization thereof.

The operation of the systems 1, 100, 200 will now be described.

In each and every embodiment, the first (top) plate 2, 102, 202 and the second (bottom) plate 3 are configured for mating together to define a matrix of bio-electronic sensors BS, see FIGS. 13, 15A, 16, 18A-18D, 20A-20D, 22A-22C, 24, 26, 28B. As anticipated, each bio-electronic sensor BS comprises the gate electrode 7, 106, 207 and the corresponding one or more, preferably at least two, source-drain channels 9, 10 in the corresponding receptacle 5. The biosensor BS also includes, in operation, the gating electrolyte (liquid, gel, or in general mixture containing ions) that fills each receptacle 5 and contains the species or substances to be sensed by the biosensor BS. The system 1, 100, 200 hence operates as a transistor biosensor cluster for biological assay.

More specifically, when in operation, each receptacle 5 receives a corresponding protrusion 4, 104, 204 carrying the respective gate electrode 7, 106, 207, which accordingly faces the electrically active patterned materials.

Figures 15A, 16:
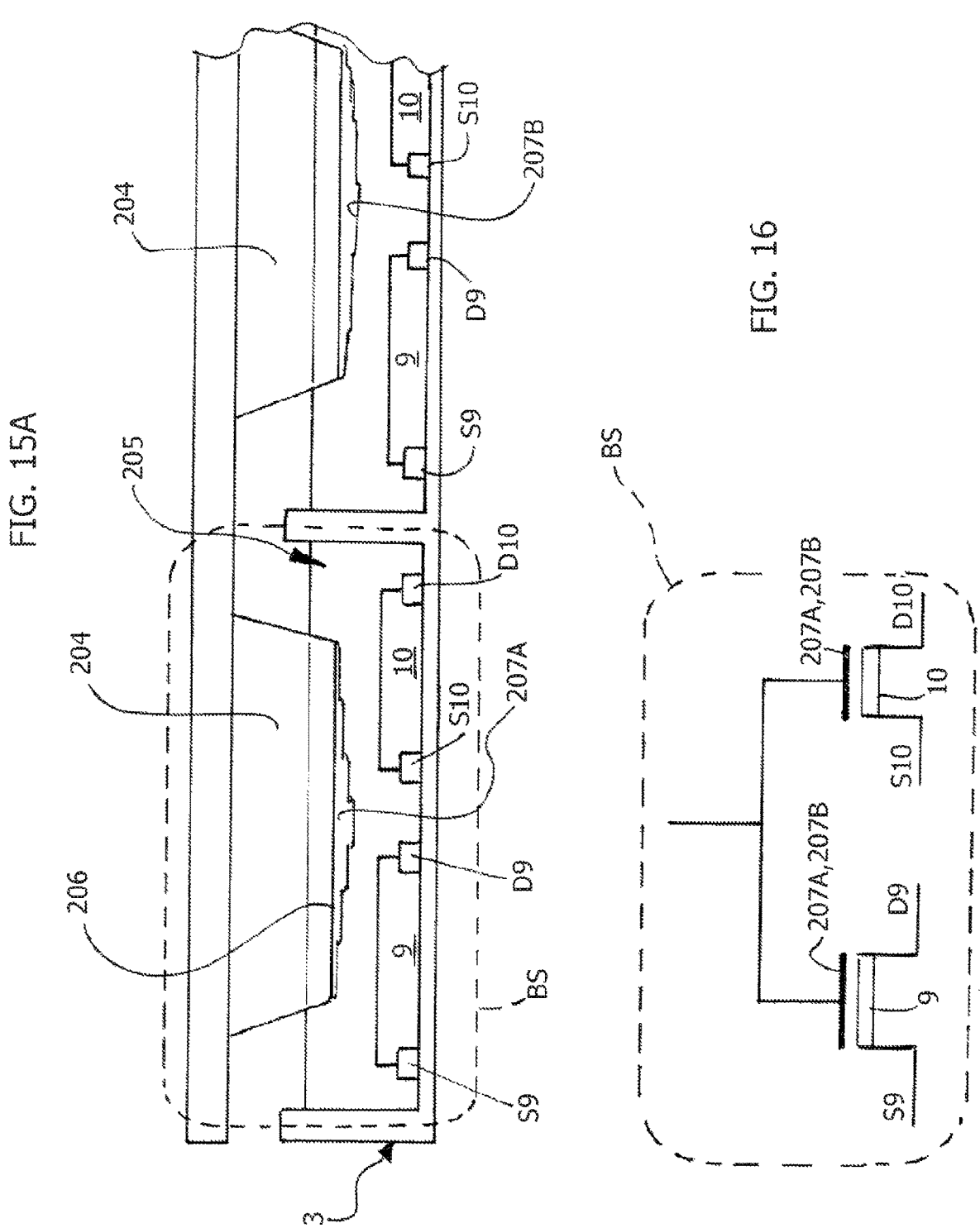
FIG. 15A is a schematic partial sectional view of the system of FIG. 15.
FIG. 16 is an electrical equivalent layout of the arrangement of FIG. 15A, FIGS. 17-28 show various transistor layouts according to embodiments of the invention.

More specifically, in the embodiments of the plate 3 shown in the FIGS. 15, 15A (FIG. 16 in particular shows a circuit layout thereof), each bio-electronic sensor BS actually includes two electrolyte-gated field effect transistors with a single (common) bio-functionalized gate electrode 7, 106, 207.

In other embodiments two or more biofunctionalized gates can be common to two or more transistors These embodiments enable differential sensing of two or more biofunctionalized gates with the very same two or more transistors and this, in turn, greatly improves the reliability and stability of the biosensors.

More in detail, two or more transistors are gated by the biofunctionalized gate while the other biofunctionalized gate(s) are left floating (electrically disconnected, viz. not biased). One or more biofunctionalized gate is selective to the target analyte (e.g. protein, DNA, virus) while other(s) biofunctionalized gate(s) are designed so as not to bind the target analyte. Since only one biofunctionalized gate is biased at a time while the others are not biased, the FET biosensor measures both the biorecognition response to the target analyte and the responses due to unspecific binding events with the very same transistor structure (viz. source-drain electrodes, semiconductor(s) and conductors(s)). This enables to cancel out the process variability due to the transistor manufacturing and unspecific binding.

Therefore, this structure greatly improves the reliability of the biosensing system. Moreover, by using more than one biofunctionalized gate selective to the target analyte it is possible to average the various responses, thus further reducing the variability due to the biofunctionalization process.

The shape of the first plate 2, 102, 202 enables to easily immerse the gate electrodes in the receptacles 5 for biosensor operation and assay of biological molecules in the electrolyte gate solution, as well as in processing receptacles or pools for functionalization of the gate electrode 7.

Therefore, the plate 2 enables, at the same time, to place each gate electrode 7, 106, 207 in a separate well for biological assay, and to place two or more electrodes (or all the electrodes 7, 106, 207) in a processing well or pool to achieve a simple, yet effective chemical functionalization and/or biological functionalization of the gate electrodes.

One or more geometrical dimension(s) (viz. width, length and thickness) and/or the volume of each patterned material of the source-drain channels 9, 10, the specific material, and the type of gating electrolyte define the electrical properties of the patterned material in contact with the electrolyte, as for example the capacitance (named $C_{TFT}$), resistance ($R_{TFT}$), interface charge ($Q_{TFT}$), and bulk charge ($B_{TFT}$).

The gate electrode(s) 7, 106, 207 of the top plate 2 and the patterned materials of the source-drain channels 9, 10 of the bottom plate 3 can be connected to other devices of the plates and/or external electronic devices for addressing, reading and biasing purposes by taking advantage of contact pads provided over the plates 2, 102, 202, 3, as disclosed in the foregoing. When a gate electrode 7, 106, 207 of the top plate 2 is exposed (e.g. by immersion or contact) to the electrolyte in the corresponding receptacle 5 of the bottom plate 3, a capacitance $C_G$, an interface charge $Q_G$ and a bulk charge $B_G$ are obtained.

These physical quantities depend on the geometries of the gate electrode, on the material of the gate electrode, on the voltage applied to the gate electrode, on the electrolyte in contact with the gate and with the semiconductor(s)/conductor(s) used for the channel(s). The bioelectronic characteristics of the bio-electronic sensors BS of the matrix strictly depend on the physical quantities ($C_G$, $Q_G$, $B_G$) of the gate electrode 7, 106, 207 of the top plate, and on the physical quantities ($C_{TFT}$, $Q_{TFT}$, $B_{TFT}$, $R_{TFT}$) of the patterned materials of the source-drain channels 9, 10 in the receptacles 5 of the bottom plate 3.

This enables the optimization of the bioelectronic response as the biofunctionalized gate electrodes 7, 106, 207 of the top plate 2, 102, 202 can detect one or more biomarkers (like proteins, antigens, DNA, bacteria) and the limit of detection, the sensitivity and the dynamic range can be tuned by tweaking the design of the materials and geometries thereof.

By way of example, using the same biofunctionalized gate electrode 7, 106, 207 with a first patterned semiconductor with $C_{TFT1} > C_G$ (e.g. $C_{TFT1} = 3 \times C_G$) and with a second patterned semiconductor with $C_{TFT2} > C_G$ (e.g. $C_{TFT1} = 20 \times C_G$) placed in the same well, it is possible to achieve single molecule detection with the electrolyte-gated transistor in the cluster BS having the first semiconductor, and a detection with a dynamic range of several orders of magnitude with the electrolyte-gated transistor featuring the second semiconductor. This is the case, for example, of a preferred embodiment of the system 200.

FIGS. 17-28 show multiple circuit layouts for reading and amplification of the biosensors BS of the systems 1, 100, 200. By way of general premise, anytime a semiconductor or conductor pad is introduced in the description which defines a transistor (e.g. T1, T2, T3, T4) when operating together with a gate electrode on the plate 2, 102, 202, the pad in itself is representative of a source-drain channel, so that references T1, T2, T3, T4, etc. may be regarded as representative of the full transistor, as well as the source-drain channel only.

FIGS. 17A-17B show a common source configuration. The biofunctionalized gate 7 is sensed with a transistor T1 (which is representative of each bisensor BS) and a resistor load R is used for current-voltage conversion and amplification. In an embodiment the resistor R can be integrated into the receptacle 5 of the plate 3 or it can be an external element, embedded into the reading and addressing electronics used for addressing, reading and electrically conditioning the matrix of biosensors BS. The configurations are suitable for both n-type (FIG. 17A) and p-type (FIG. 17B) transistors. The output voltage $V_O = -g_m*[r_O*R/(r_O+R)]*V_I$ where $g_m = dI_D/dV_G$ is the transistor transconductance, $r_O = (dI_D/dV_D)^{-1}$ is the transistor output resistance and R is the load resistance and VI is the input voltage which depends on both external bias of the gate and biological event(s) occurred at the biofunctionalized gate.

In the case the biological event(s) results in a variation of the transistor threshold voltage $\Delta V_{TH}$, the corresponding output voltage variation is equal to $\Delta V_O = -g_m*[r_O*R/(r_O+R)]*\Delta V_{TH}$.

In the case the biological event results in a variation of the transistor capacitance, this results in a variation of the transconductance $\Delta g_m$, and the corresponding output voltage variation is equal to $\Delta V_O = -\Delta g_m*[r_O*R/(r_O+R)]*V_I$.

Under typical operating conditions $R \ll r_O$ and the signal amplification reads $\Delta V_O/\Delta V_{TH} = -g_m*R$ and $\Delta V_O/\Delta g_m = -R*V_I$, respectively.

By the way of example, assuming $V_{SS} = 0$ V, $V_{DD} = 1$V, $g_m = 10$ μS, $\Delta V_{TH} = 10\% V_{DD} = 0.1$ V and $\Delta g_m = 10\% g_m = 1$ μS, an amplification equal to 10 is achieved when R=1 MΩ. In this example the circuit is operated in steady-state conditions (viz. DC conditions) but it can be also operated in transient conditions (AC conditions) where the input signal is a DC voltage combined with an AC signal, as for example a sine, a triangular or a square waveform.

In another embodiment the load resistor is replaced with a series current generator G to the transistor T1 as showed in FIGS. 17C and 17D. The current generator could be an external circuit, which is part of the external reading and addressing electronics. The bias current $I_B$ of the current generator sets the operating conditions of the bio-transistor providing a larger amplification and/or a large dynamic range of operation. The circuit topology shown in FIGS. 17C and 17D can be operated as described for the circuit topologies shown in FIGS. 17A and 17B, respectively.

Moreover, in the case the biological event results in a variation of the transistor threshold voltage and/or transconductance, the circuit topologies showed in FIGS. 17C and 17D can be operated as follows.

Before the biosensing a transfer characteristic $V_O$-$V_I$ is measured. The transition voltage $V_T$ is defined as the input voltage where $V_O = V_{DD}$ (topology in FIG. 17C) or $V_O = V_{SS}$ (topology in FIG. 17D).

The current $I_B$ is set in order to obtain $V_{TB} = (V_{DD}-V_{SS})/2$ or, if not possible because of any constraint due to the material technology used, as close as possible to this value.

Then the biofunctionalized gate is incubated into the fluid concerned, a new transfer characteristic $V_O$-$V_I$ is measured and the corresponding transition voltage $V_{TS}$ is obtained. The output signal is then computed as $(V_{TS}-V_{TB})/V_{TB}$.

FIGS. 17E and 17F show embodiments configured as a variant of FIGS. 17C and 17D, particularly wherein the current generator G is replaced by a transistor T1 or T2 operated as a current generator gated by a bias voltage $V_{BIAS}$.

The circuit layouts of FIGS. 17A-17F are readily applicable to the embodiments 1, 100, 200.

Figure 17:
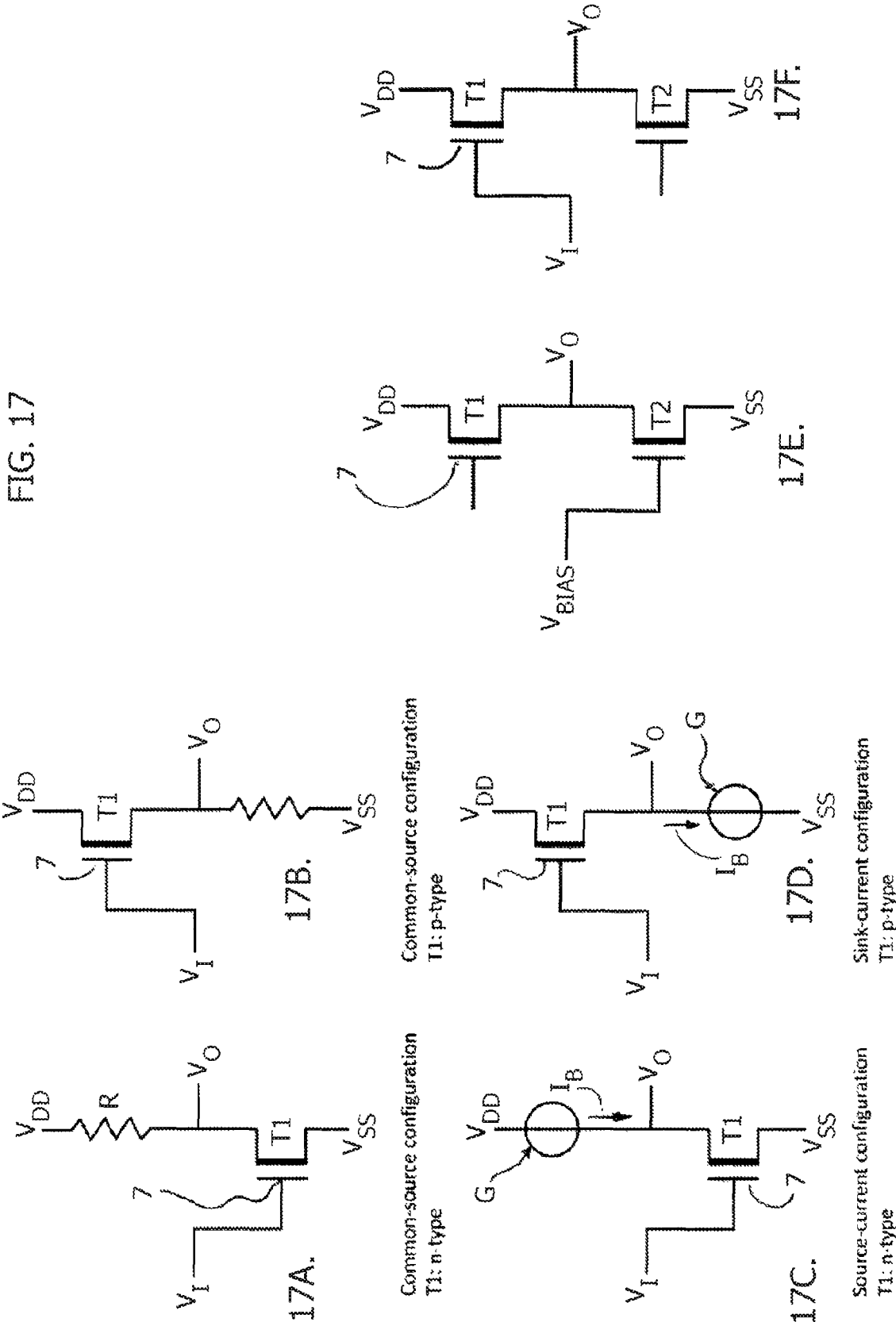
Figures 18, 18A, 18B:
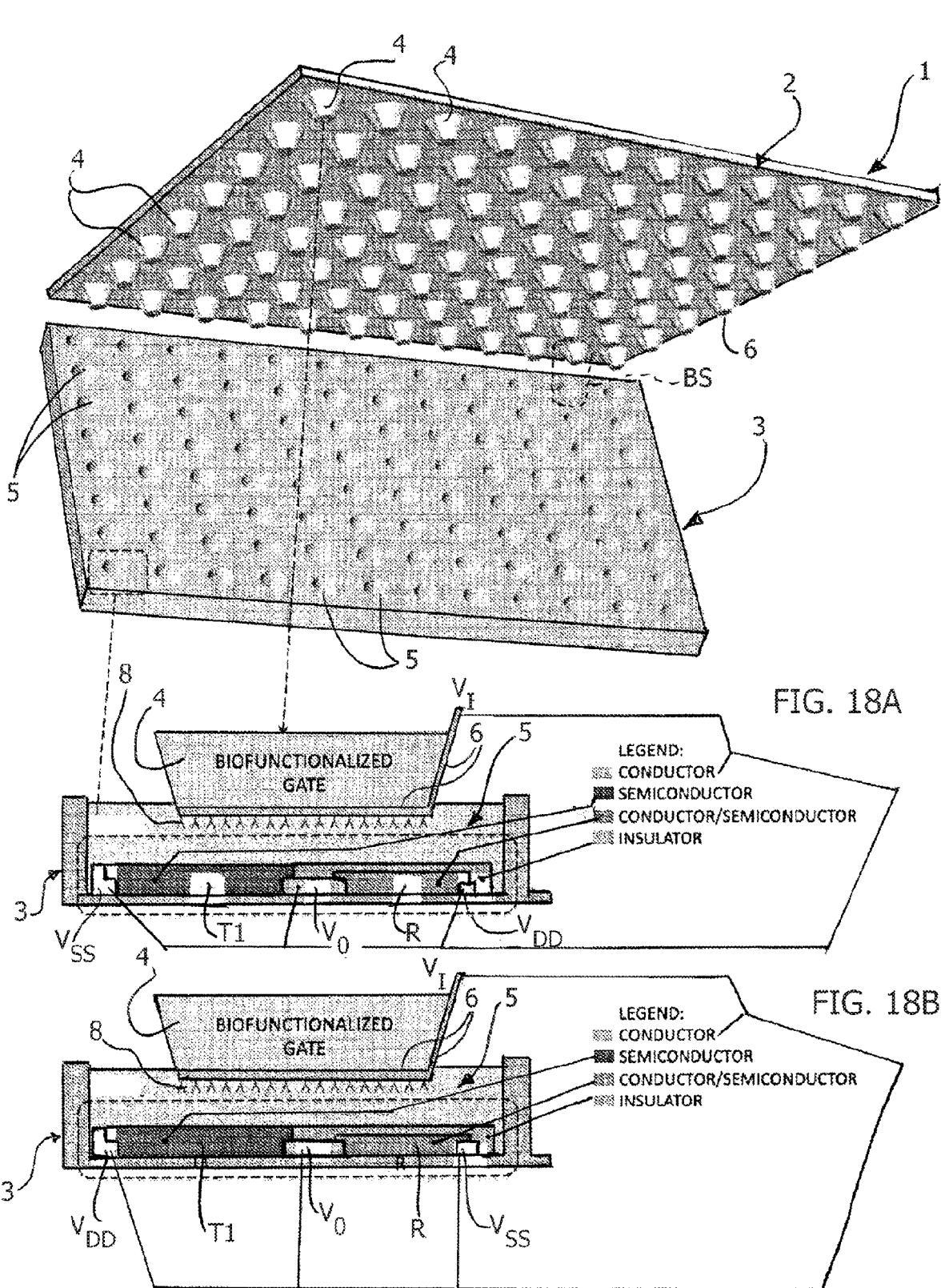

FIGS. 18, 18A, 18B are representative of embodiments of the system 1 (although they readily apply to the systems 100, 200 as well) practiced in accordance with the circuit layouts of FIGS. 17A-17B, namely FIG. 18 is a view of the system 1 as a whole, while FIGS. 18A and 18B are partial, schematic, and sectional views of components arrangement in the receptacles 5 of the lower plate 3.

Each of FIGS. 18A, 18B (the same applies to subsequent figures of the same type) comes with a legend of the different species (components and/or materials) involved in the construction of the transistor(s) in the receptacle 5. Such components/materials include, i.a., conductor, semiconductor, conductor/semiconductor (viz. either a conductor or semiconductor can be used), insulator, electrolyte gel.

In the embodiment of FIG. 18A, corresponding to the circuit topology showed in FIG. 17A, each receptacle 5 include a semiconductor pad set alongside a conductor/semiconductor pad enclosed in an insulator. Electrical contact pads made of conductor (electrically conductive) material are also provided at the receptacle 5 and electrically connected to the semiconductor and the conductor/semiconductor pads to define, together with the biofunctionalized gate electrode 6 carried by the protrusion 4, the transistor T1 and the resistor R. Accordingly, the sequence of contact pads, left to right, is $V_{SS}$, $V_O$, $V_{DD}$. All of the components referred to herein in connection with FIG. 18A are immersed, in use, in a gating electrolyte including a solution containing one or more species or substances to be detected by the biosensor BS.

In the embodiment of FIG. 18B, corresponding to the circuit layout of FIG. 17B, each receptacle 5 include a semiconductor pad set alongside a conductor/semiconductor pad enclosed in an insulator. Electrical contact pads made of conductor (electrically conductive) material are also provided at the receptacle 5 and electrically connected to the semiconductor and the conductor/semiconductor pads to define, together with the biofunctionalized gate electrode 6 carried by the protrusion 4, the transistor T1 and the resistor R. Accordingly, the sequence of contact pads, left to right, is $V_{DD}$, $V_O$, $V_{SS}$. All of the components referred to herein in connection with FIG. 18B are immersed, in use, in a gating electrolyte including a solution containing one or more species or substances to be detected by the biosensor BS.

Figures 18C, 18D:
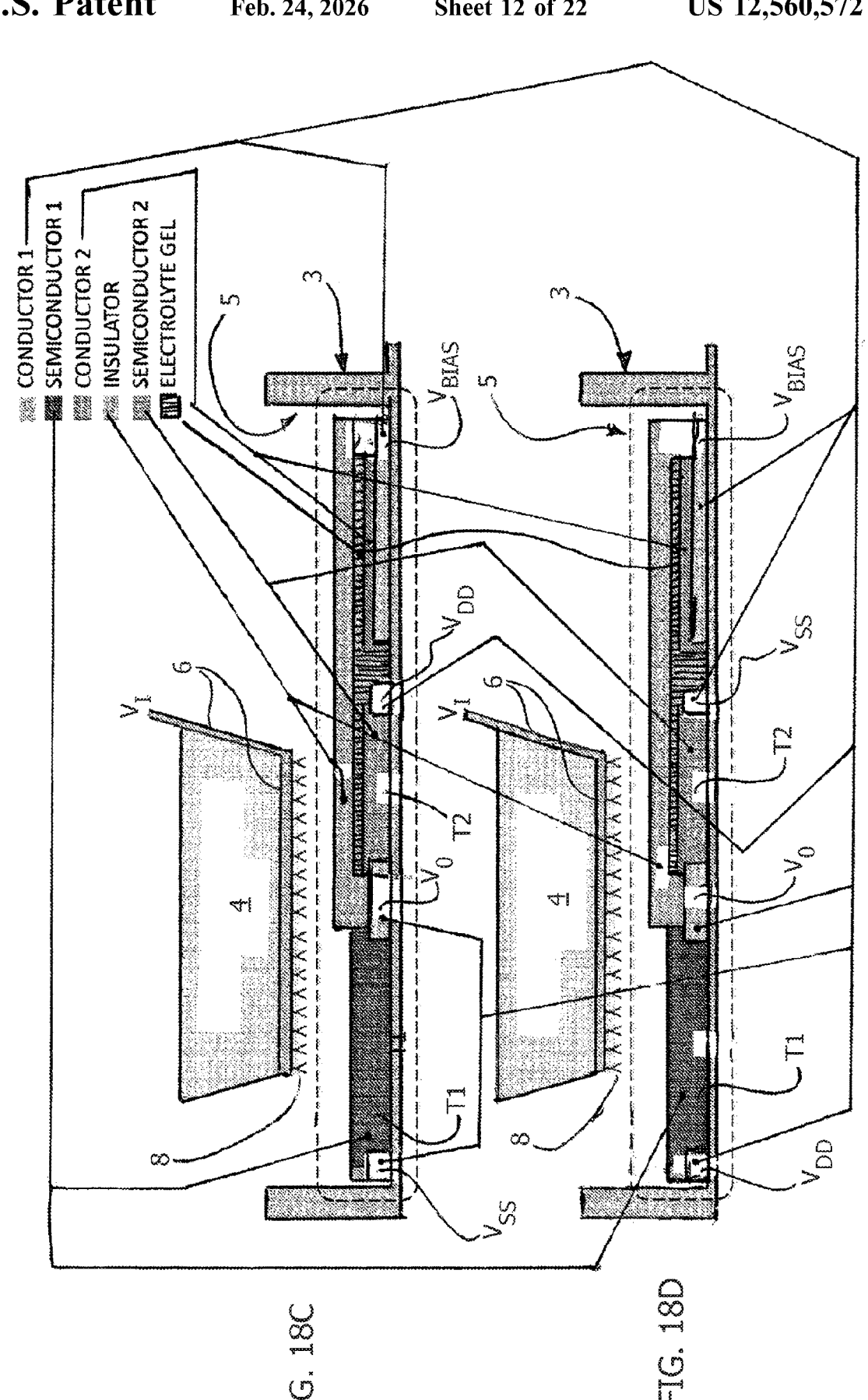
Figure 20:
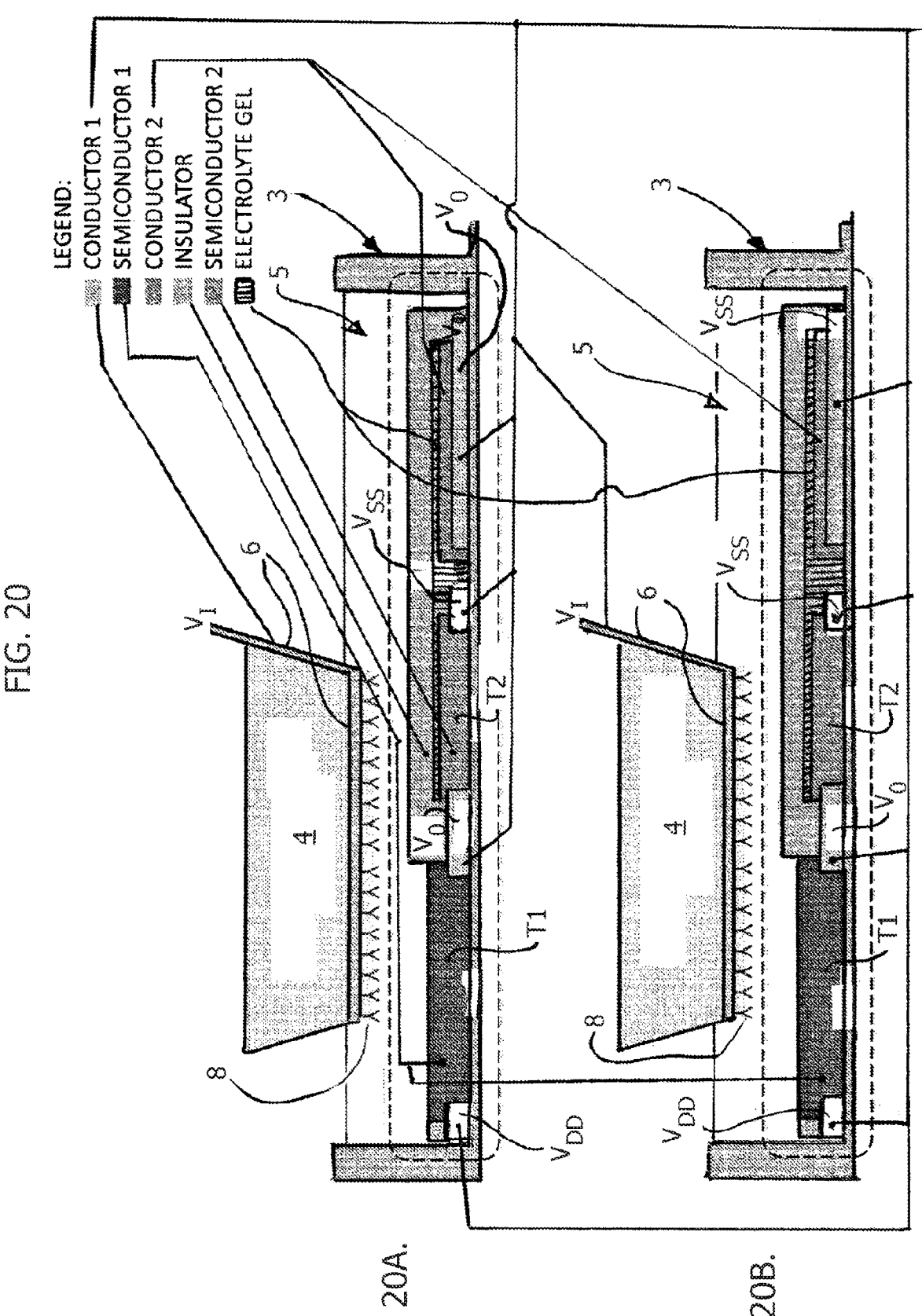
Figure 20:
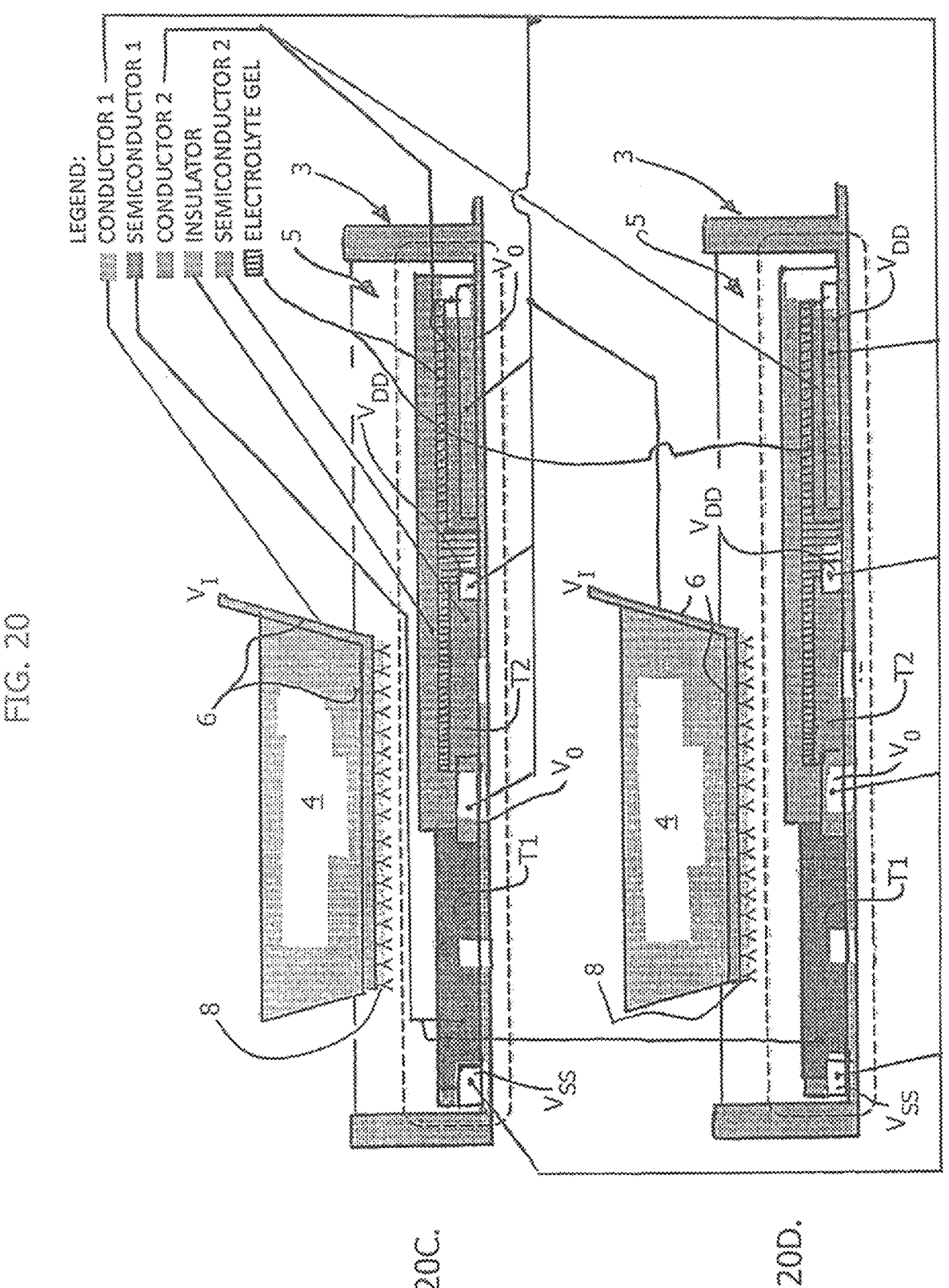
Figure 22:
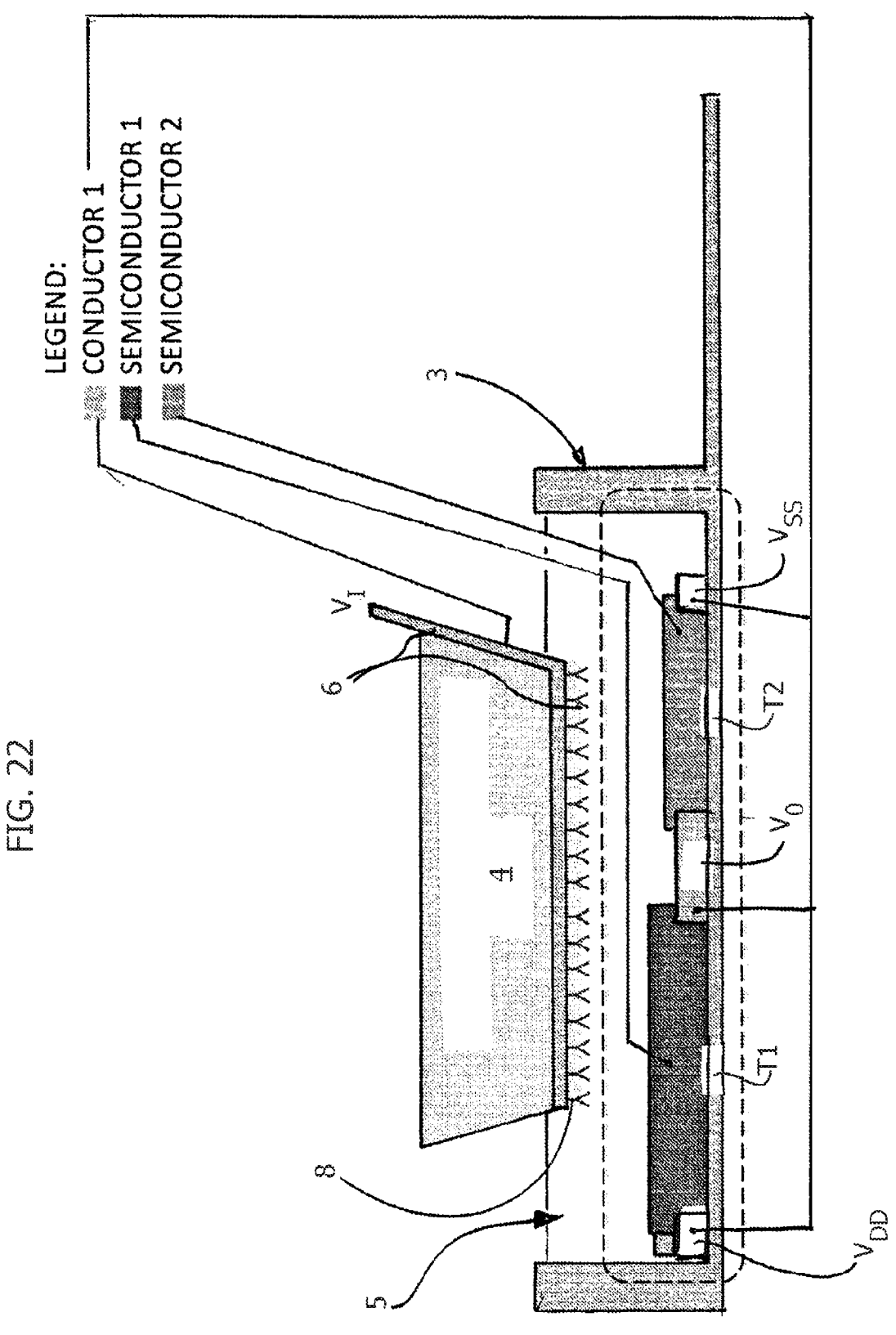
Figure 22:
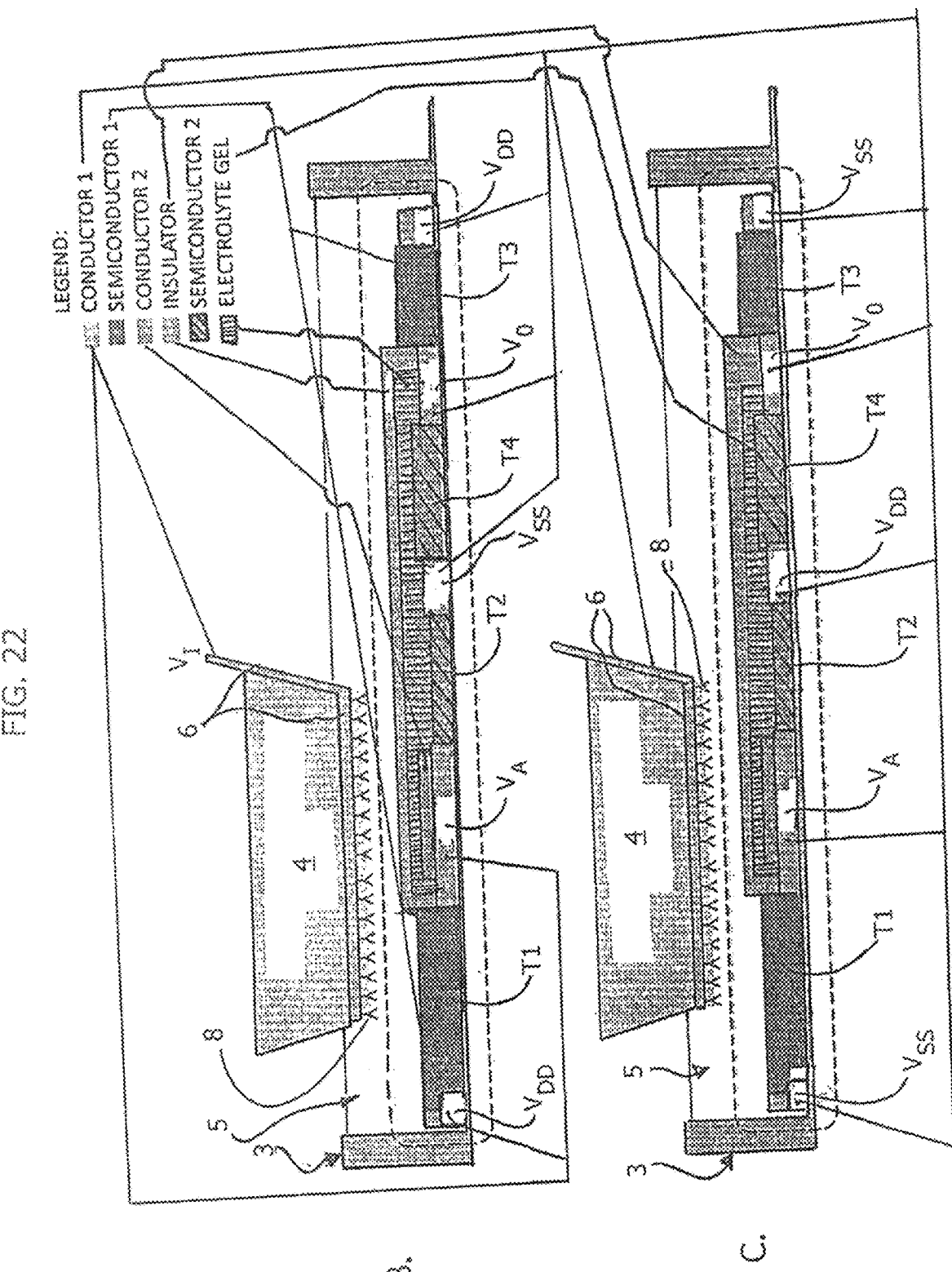

In the embodiment of FIG. 18C, corresponding to the circuit topology of FIG. 17E, each receptacle 5 include a first semiconductor pad (SEMICONDUCTOR 1) set alongside a second semiconductor pad (SEMICONDUCTOR 2). Electrical contact pads $V_{SS}$, $V_O$, $V_{DD}$, $V_{BIAS}$ (left to right) are provided at the bottom of the receptacle 5, with the first semiconductor pad (SEMICONDUCTOR 1) being electrically connected to the pads $V_{SS}$, $V_O$ and the second semiconductor pad (SEMICONDUCTOR 2) connected to the pads $V_O$ and $V_{DD}$. The first semiconductor pad (SEMICONDUCTOR 1) defines, together with the overhead biofunctionalized gate electrode 6, the transistor T1. As to the transistor T2, the contact pad $V_{BIAS}$ is covered in a second conductor material (generally different from the conductor material of the contact pads $V_{SS}$, $V_O$, $V_{DD}$, $V_{BIAS}$), and the second semiconductor pad (SEMICONDUCTOR 2) together with the contact pad $V_{BIAS}$ and the second conductor material layer covering the contact pad $V_{BIAS}$ are enclosed in an electrolyte gel gating the transistor T2 (and defining the transistor T2 overall).

The transistor T2 is in turn enclosed in an insulator material, and both transistors T1, T2—as well as the gate electrode 6—are immersed, in use, in a gating electrolyte including a solution containing one or more species or substances to be detected by the biosensor BS.

In the embodiment of FIG. 18D, corresponding to the circuit layout of FIG. 17F, each receptacle 5 include a first semiconductor pad (SEMICONDUCTOR 1) set alongside a second semiconductor pad (SEMICONDUCTOR 2). Electrical contact pads $V_{DD}$, $V_0$, $V_{SS}$, $V_{BIAS}$ (left to right) are provided at the bottom of the receptacle 5, with the first semiconductor pad (SEMICONDUCTOR 1) being electrically connected to the pads $V_{DD}$, $V_0$ and the second semiconductor pad (SEMICONDUCTOR 2) connected to the pads $V_0$ and $V_{SS}$. The first semiconductor pad (SEMICONDUCTOR 1) defines, together with the overhead biofunctionalized gate electrode 6, the transistor T1. As to the transistor T2, the contact pad $V_{BIAS}$ is covered in a second conductor material (generally different from the conductor material of the contact pads $V_{DD}$, $V_0$, $V_{SS}$, $V_{BIAs}$), and the second semiconductor pad (SEMICONDUCTOR 2) together with the contact pad $V_{BIAS}$ and the second conductor material layer covering the contact pad $V_{BIAS}$ are enclosed in an electrolyte gel gating the transistor T2 (and defining the transistor T2 overall).

The transistor T2 is in turn enclosed in an insulator material, and both transistors T1, T2—as well as the gate electrode 6—are immersed, in use, in a gating electrolyte including a solution containing one or more species or substances to be detected by the biosensor BS.

FIGS. 19A-D are primarily (but not exclusively) intended for application to embodiments of the 100s and 200s type (albeit application to the system 1 is not prevented anyway), wherein the resistor or the current sink/source is replaced with a second transistor T2. The basic layout derives from that shown in FIG. 16 (with a double S-D channel) and is further modified to enhance performances.

The second transistor T2 could be integrated in the single biosensor BS of the system 1 (as in the embodiment 200) or can be included in the external electronics.

In the embodiment shown in FIG. 20A both the transistors T1 and T2 can be placed in each receptacle 205 of the plate 3 array and the bio-functionalized gate(s) 7, 106, 207A, 207B is the gate of the transistor T1.

Transistor T2 has another separate gate which is electrically connected to its source. Transistor T2 is an accumulation-mode device (manufactured for example with a conductive polymer) and thus outputs a current even when the gate is electrically connected to the source.

FIG. 20B show another embodiment where the load T2 has the gate electrically connected to the drain (named diode-load configuration). In a possible embodiment (FIG. 18B) both the transistors T1 and T2 can be placed in a receptacle 5, 205 of the plate 3 array and the bio-functionalized gate is the gate 7, 106, 207A, 207B of the transistor T1.

Transistor T2 has another separated gate which is electrically connected to its drain. In another possible embodiment transistor T2 can be included into the external circuitry used for reading and addressing each element of the biosensor system 1.

FIGS. 20C and 20D are the n-type versions corresponding to the p-type versions presented in FIGS. 20A and 20B, respectively.

FIGS. 20A, 20B, 20C, 20D are reductions to practice of the circuit layouts of FIGS. 19A, 19B, 19C, 19D respectively.

In the embodiment of FIG. 20A, corresponding to the circuit topology of FIG. 19A, each receptacle 5 include a first semiconductor pad (SEMICONDUCTOR 1) set alongside a second semiconductor pad (SEMICONDUCTOR 2). Electrical contact pads $V_{DD}$, $V_0$, $V_{SS}$, $V_0$ (left to right) are provided at the bottom of the receptacle 5, with the first semiconductor pad (SEMICONDUCTOR 1) being electrically connected to the pads $V_{DD}$, $V_0$ and the second semiconductor pad (SEMICONDUCTOR 2) connected to the pads $V_0$ and $V_{SS}$. The first semiconductor pad (SEMICONDUCTOR 1) defines, together with the overhead biofunctionalized gate electrode 6, the transistor T1. As to the transistor T2, the rightmost contact pad $V_0$ is covered in a second conductor material (generally different from the conductor material of the contact pads $V_{DD}$, $V_0$, $V_{SS}$, $V_0$), and the second semiconductor pad (SEMICONDUCTOR 2) together with the rightmost contact pad $V_0$ and the second conductor material layer covering the rightmost contact pad $V_0$ are enclosed in an electrolyte gel gating the transistor T2 (and defining the transistor T2 overall).

The transistor T2 is in turn enclosed in an insulator material (INSULATOR), and both transistors T1, T2—as well as the gate electrode 6—are immersed, in use, in a gating electrolyte including a solution containing one or more species or substances to be detected by the biosensor BS.

In the embodiment of FIG. 20B, corresponding to the circuit topology of FIG. 19B, each receptacle 5 include a first semiconductor pad (SEMICONDUCTOR 1) set alongside a second semiconductor pad (SEMICONDUCTOR 2). Electrical contact pads $V_{DD}$, $V_0$, $V_{SS}$, $V_{SS}$ (left to right) are provided at the bottom of the receptacle 5, with the first semiconductor pad (SEMICONDUCTOR 1) being electrically connected to the pads $V_{DD}$, $V_0$ and the second semiconductor pad (SEMICONDUCTOR 2) connected to the pads $V_0$ and $V_{SS}$. The first semiconductor pad (SEMICONDUCTOR 1) defines, together with the overhead biofunctionalized gate electrode 6, the transistor T1. As to the transistor T2, the rightmost contact pad $V_{SS}$ is covered in a second conductor material (generally different from the conductor material of the contact pads $V_{DD}$, $V_0$, $V_{SS}$, $V_{SS}$), and the second semiconductor pad (SEMICONDUCTOR 2) together with the rightmost contact pad $V_{SS}$ and the second conductor material layer covering the rightmost contact pad $V_{SS}$ are enclosed in an electrolyte gel gating the transistor T2 (and defining the transistor T2 overall).

The transistor T2 is in turn enclosed in an insulator material (INSULATOR), and both transistors T1, T2—as well as the gate electrode 6—are immersed, in use, in a gating electrolyte including a solution containing one or more species or substances to be detected by the biosensor BS.

In the embodiment of FIG. 20C, corresponding to the circuit topology of FIG. 19C, each receptacle 5 include a first semiconductor pad (SEMICONDUCTOR 1) set alongside a second semiconductor pad (SEMICONDUCTOR 2). Electrical contact pads $V_{SS}$, $V_0$, $V_{DD}$, $V_0$ (left to right) are provided at the bottom of the receptacle 5, with the first semiconductor pad (SEMICONDUCTOR 1) being electrically connected to the pads $V_{SS}$, $V_0$ and the second semiconductor pad (SEMICONDUCTOR 2) connected to the pads $V_0$ and $V_{DD}$. The first semiconductor pad (SEMICONDUCTOR 1) defines, together with the overhead biofunctionalized gate electrode 6, the transistor T1. As to the transistor T2, the rightmost contact pad $V_0$ is covered in a second conductor material (generally different from the conductor material of the contact pads $V_{SS}$, $V_0$, $V_{DD}$, $V_0$), and the second semiconductor pad (SEMICONDUCTOR 2) together with the rightmost contact pad $V_0$ and the second conductor material layer covering the rightmost contact pad $V_0$ are enclosed in an electrolyte gel gating the transistor T2 (and defining the transistor T2 overall).

The transistor T2 is in turn enclosed in an insulator material (INSULATOR), and both transistors T1, T2—as well as the gate electrode 6—are immersed, in use, in a gating electrolyte including a solution containing one or more species or substances to be detected by the biosensor BS.

In the embodiment of FIG. 20D, corresponding to the circuit topology of FIG. 19D, each receptacle 5 include a first semiconductor pad (SEMICONDUCTOR 1) set alongside a second semiconductor pad (SEMICONDUCTOR 2). Electrical contact pads $V_{SS}$, $V_0$, $V_{DD}$, $V_{DD}$ (left to right) are provided at the bottom of the receptacle 5, with the first semiconductor pad (SEMICONDUCTOR 1) being electrically connected to the pads $V_{SS}$, $V_0$ and the second semiconductor pad (SEMICONDUCTOR 2) connected to the pads $V_0$ and $V_{DD}$. The first semiconductor pad (SEMICON-DUCTOR 1) defines, together with the overhead biofunctionalized gate electrode 6, the transistor T1. As to the transistor T2, the rightmost contact pad $V_0$ is covered in a second conductor material (generally different from the conductor material of the contact pads $V_{SS}$, $V_0$, $V_{DD}$, $V_{DD}$), and the second semiconductor pad (SEMICONDUCTOR 2) together with the rightmost contact pad $V_{DD}$ and the second conductor material layer covering the rightmost contact pad $V_{DD}$ are enclosed in an electrolyte gel gating the transistor T2 (and defining the transistor T2 overall).

The transistor T2 is in turn enclosed in an insulator material (INSULATOR), and both transistors T1, T2—as well as the gate electrode 6—are immersed, in use, in a gating electrolyte including a solution containing one or more species or substances to be detected by the biosensor BS. Further embodiments of a single element of the system according to the invention is shown in FIGS. 21A-C. In the embodiment of FIG. 21A two transistors, one n-type and one p-type, are integrated into the same receptacle 5, 205 of the plate 3 in a complementary configuration. The drain electrode of the p-type transistor is electrically connected to the source electrode of the n-type transistor and this is also the output signal $V_O$. The biofunctionalized gate 7, 106, 207A, 207B on the plate 2, 202 is common to the two transistors T1, T2. The bio-circuit can be operated in DC (viz. steady-state) or AC (viz. time-varying) conditions in order to emphasize the biological event transconduction and amplification.

In a possible DC operation, the input voltage $V_I$ can be swept from $V_{SS}$ to $V_{DD}$ and the transfer characteristics $V_O$-$V_I$ is measured. Then, $V_I$ is biased in order to obtain $V_O$=($V_{DD}$-$V_{SS}$)/2. The biofunctionalized gate is then incubated with a liquid of interest and then the biological event is measured as a variation of the output voltage $V_O$. Considering that the gain G of a complementary configuration (FIG. IVa) is typically larger than 10 (e.g. even>100 is possible [https://doi.org/10.1038/s41467-019-11073-4]), the variation of the gate capacitance and/or work-function due to the biological event is reflected in a variation of the input voltage $V_I$ which is, in turn, amplified by a factor G.

This solution results in an improved sensitivity and signal-to-noise ratio. This is in general a preferred embodiment as compared to those shown in FIGS. 17 and 19 when both n-type and p-type transistors are available.

Another possible embodiment of a single element of the transistor matrix is showed in FIG. 21B. In this case a p-type transistor T1 gated by the bio-functionalized gate 7, 106, 207A, 207B is connected to the transistor T2 according to the configuration displayed in FIG. 19A and this unipolar current sink configuration drives the p-type transistors T3 and T4. The relation between the output voltage $V_O$ and the input voltage $V_I$ is analogous to the embodiment displayed in FIG. 19A with the advantage of larger gain and reduced power consumption. FIG. 21B is basically the unipolar p-type implementation of the complementary configuration showed in FIG. 21A.

Similar considerations apply in the case of a n-type implementation of the unipolar pseudo-complementary configuration displayed in FIG. 21C.

It is noted that in all the embodiments shown in FIGS. 17, 19, and 21, a feedback circuit connecting $V_O$ and $V_I$ can be envisaged when an AC coupling with the input signal is provided.

By way of example, the simplest feedback circuit can be a resistor and/or a transistor where the source and drain of such feedback transistor are connected to the input and output nodes while the gate is biased in order to set the proper feedback.

FIGS. 22A, 22B, 22C are reductions to practice of the circuit layouts of FIGS. 21A, 21B, 21C, respectively.

In the embodiment of FIG. 22A, corresponding to the circuit topology of FIG. 21A, each receptacle 5 include a first semiconductor pad (SEMICONDUCTOR 1) set alongside a second semiconductor pad (SEMICONDUCTOR 2). Electrical contact pads $V_{DD}$, $V_0$, $V_{SS}$ made of conductor (electrically conductive) material are also provided at the receptacle 5 and electrically connected to the first semiconductor pad (SEMICONDUCTOR 1) and the second semiconductor pad (SEMICONDUCTOR 2) to define, together with the biofunctionalized gate electrode 6 carried by the protrusion 4, the transistor T1 and the transistor T2. Accordingly, the sequence of contact pads, left to right, is $V_{DD}$, $V_0$, $V_{SS}$. All of the components referred to herein in connection with FIG. 22A are immersed, in use, in a gating electrolyte including a solution containing one or more species or substances to be detected by the biosensor BS.

In the embodiment of FIG. 22B, corresponding to the circuit topology of FIG. 21B, each receptacle 5 includes—left to right—a first semiconductor pad (SEMICONDUC-TOR 1) made of a first semiconductor material, a second semiconductor pad and a third semiconductor pad made of a second semiconductor material (SEMICONDUCTOR 2), and a fourth semiconductor pad (SEMICONDUCTOR 1) made of the first semiconductor material. Electrical contact pads $V_{DD}$, $V_A$, $V_{SS}$, $V_0$, $V_{DD}$ (left to right) are provided at the bottom of the receptacle 5, with the following connection pattern:

the first semiconductor pad is electrically connected to the pads $V_{DD}$ (leftmost), $V_A$ the second semiconductor pad is connected to the pads $V_A$ and $V_{SS}$ the third semiconductor pad is connected to the pads $V_{SS}$ and $V_0$ the fourth semiconductor pad is connected to the pads $V_0$ and $V_{DD}$ (rightmost).

The first semiconductor pad defines, together with the overhead biofunctionalized gate electrode 6, the transistor T1, while the fourth semiconductor pad defines, together with the overhead biofunctionalized gate electrode 6, the transistor T3.

As to the transistors T2, T4 the contact pad $V_A$ is covered in a second conductor material (generally different from the conductor material of the contact pads $V_{DD}$, $V_A$, $V_{SS}$, $V_0$, $V_{DD}$), while the second and third semiconductor pads together with the contact pads $V_{SS}$, $V_0$ and the second conductor material layer covering the contact pad $V_A$ are enclosed in an electrolyte gel gating the transistors T2, T4 (and defining the transistors T2, T4 overall).

The transistors T2, T4 is in turn enclosed in an insulator material (INSULATOR), and all of the transistors T1, T2, T3, T4—as well as the gate electrode 6—are immersed, in use, in a gating electrolyte including a solution containing one or more species or substances to be detected by the biosensor BS.

In the embodiment of FIG. 22B, corresponding to the circuit topology of FIG. 21B, each receptacle 5 includes—left to right—a first semiconductor pad (SEMICONDUC-TOR 1) made of a first semiconductor material, a second semiconductor pad and a third semiconductor pad made of a second semiconductor material (SEMICONDUCTOR 2), and a fourth semiconductor pad (SEMICONDUCTOR 1) made of the first semiconductor material. Electrical contact pads $V_{SS}$, $V_A$, $V_{DD}$, $V_0$, $V_{SS}$ (left to right) are provided at the bottom of the receptacle 5, with the following connection pattern:

the first semiconductor pad is electrically connected to the pads $V_{SS}$ (leftmost), $V_A$
    the second semiconductor pad is connected to the pads $V_A$ and $V_{DD}$
    the third semiconductor pad is connected to the pads $V_{DD}$ and $V_0$
    the fourth semiconductor pad is connected to the pads $V_0$ and $V_{SS}$ (rightmost).

The first semiconductor pad defines, together with the overhead biofunctionalized gate electrode 6, the transistor T1, while the fourth semiconductor pad defines, together with the overhead biofunctionalized gate electrode 6, the transistor T3.

As to the transistors T2, T4 the contact pad $V_A$ is covered in a second conductor material (generally different from the conductor material of the contact pads $V_{SS}$, $V_A$, $V_{DD}$, $V_0$, $V_{SS}$), while the second and third semiconductor pads together with the contact pads $V_{DD}$, $V_0$ and the second conductor material layer covering the contact pad $V_A$ are enclosed in an electrolyte gel gating the transistors T2, T4 (and defining the transistors T2, T4 overall).

The transistors T2, T4 is in turn enclosed in an insulator material (INSULATOR), and all of the transistors T1, T2, T3, T4—as well as the gate electrode 6—are immersed, in use, in a gating electrolyte including a solution containing one or more species or substances to be detected by the biosensor BS.

Figures 23, 24:
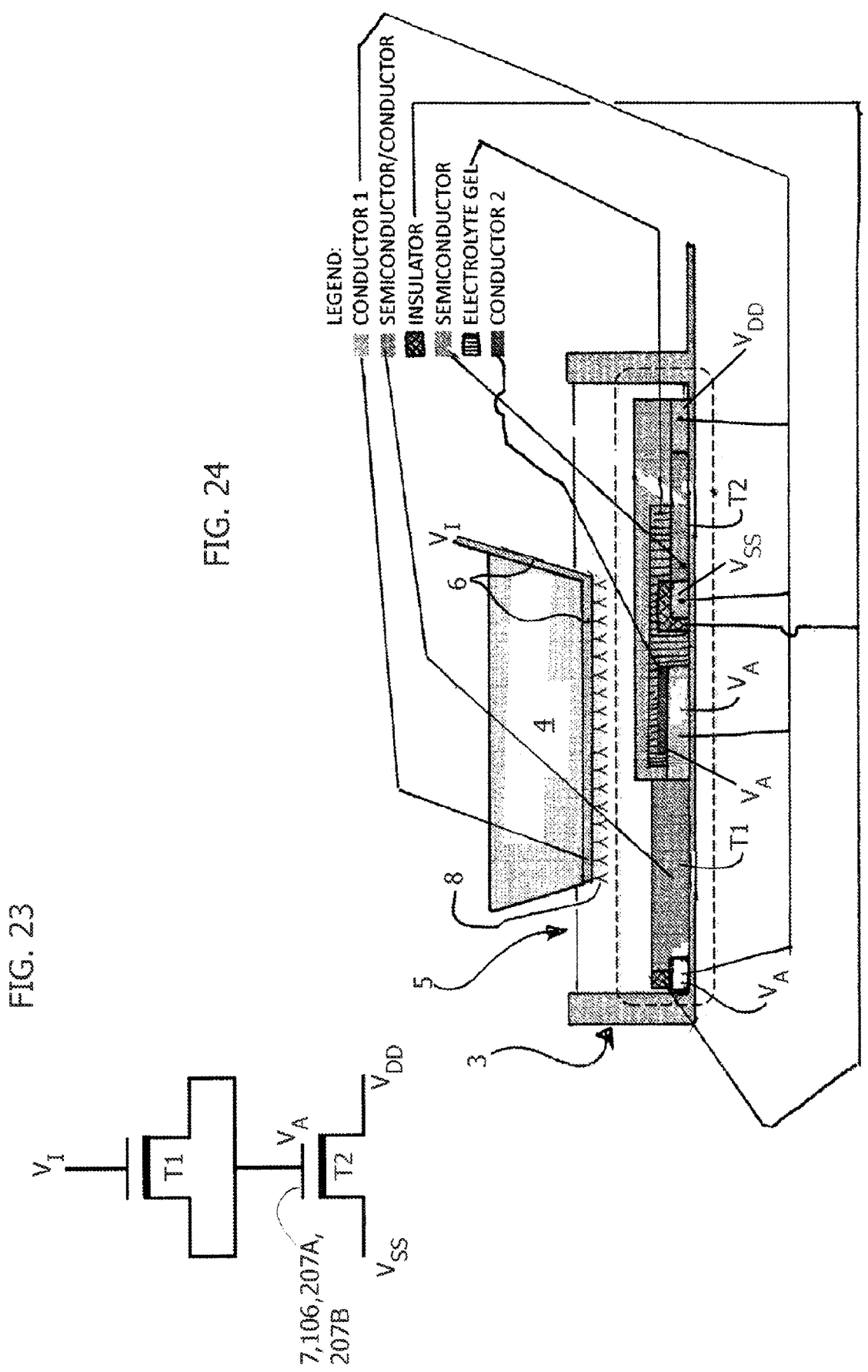

FIG. 23 shows another possible embodiment of a biosensor BS of the system according to the invention. The transistor T1 has a bio-functionalized gate and is used in a capacitor configuration while the transistor T2 is used for reading. The transistor T2 can be integrated into the various elements of the plate 3 or can be an external transistor included into the external reading and addressing electronics. The transistor T2 could also be connected with other transistors according to the previous embodiments and/or other electronics and amplifying external circuits.

In the embodiment of FIG. 24, corresponding to the circuit topology of FIG. 23, each receptacle 5 includes—left to right—a first pad made of, alternatively, a semiconductor material or a conductor material (SEMICONDUCTOR/CONDUCTOR), and a second pad made of a semiconductor material (either different or the same as the material of the first pad).

Electrical contact pads $V_A$, $V_A$, $V_{SS}$, $V_{DD}$ (left to right) are provided at the bottom of the receptacle 5, with the following connection pattern:

the first pad (SEMICONDUCTOR/CONDUCTOR) is electrically connected to the pads $V_A$ (leftmost), $V_A$ (rightmost)
    the second pad (SEMICONDUCTOR) is connected to the pads $V_{SS}$ and $V_{DD}$, and is gated through an electrolyte gel (ELECTROLYTE GEL) in electrical contact with a pad $V_A'$ stacked on top of the rightmost pad $V_A$ and enclosed in the electrolyte gel. Furthermore, the pad $V_{SS}$ is enclosed in an insulator material which also encloses the components in the receptacle 5 but for the first pad and the leftmost contact pad $V_A$.

The first pad defines, together with the overhead biofunctionalized gate electrode 6, the transistor T1, while the electrolyte gated second pad defines the transistor T2.

Figure 25:
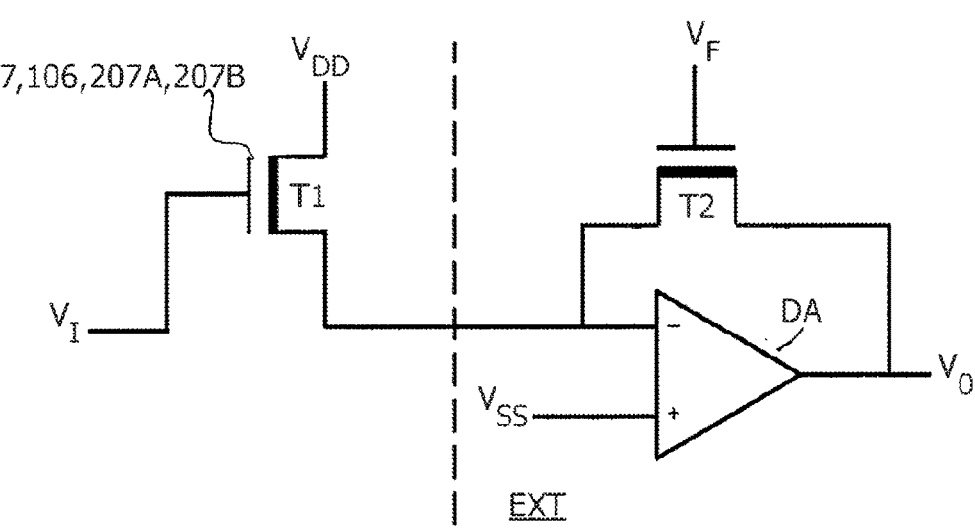

FIG. 25 shows a possible embodiment of a single biosensor transistor BS included in an element of the biosensor matrix of the system 1, 100, 200 which is connected to an external electronic circuit EXT for amplification and signal conditioning. In this embodiment a p-type transistor T1 is envisaged and similar considerations apply in case of a n-type transistor T1. The gate of the transistor is biofunctionalized (hence referred to as 7, 207A, 207B) and the transistor T1 is included in a receptacle 5. 205 of the plate 3. The source of the transistor T1 is connected to $V_{DD}$ (e.g. 0 V) while the drain is connected to the negative input of a current-voltage amplifier converter DA, which is included in the external electronics EXT for reading and addressing of the biosensors matrix (readout electronics). Since the amplifier is operated in the amplification region, the negative and positive inputs are virtually at the same potential and hence the drain of the biofunctionalized transistor T1 is virtually biased at $V_{SS}$ (e.g. $V_{DD}$−0.1V).

This extremely-low voltage operation is very relevant to improve the operating stability of the biosensor. A transistor T2, which could be included into the plate 3 or could be an external transistor, is operated as a feedback component. In other embodiments it could be replaced by a resistance or a more complex feedback circuit.

In the embodiment shown in FIG. 25, depending on the applied voltage $V_F$ the transistor T2 provides a feedback resistance $R_F = K'_2 + K''_2 / V_F$ where $K'_2$ and $K''_2$ depends on the transistor 2 geometries, materials and fabrication technology. The current $I_D$ provided by the transistor T1 depends on the biorecognition event(s) which could affect the capacitance and work-function of the biofunctionalized gate (named $C_{bio}$ and $\phi_{bio}$), and hence its current $I_D(C_{bio}, \phi_{bio})$. The output voltage $V_O$ of the current-voltage amplifier can be related to the bio-recognition event(s) as follows: $V_O = R_F * I_D(C_{bio}, \phi_{bio})$.

By way of example, assuming that the drain current of T1 has the following dependence with $C_{bio}$ and $\phi_{bio}$: $I_D(C_{bio}, \phi_{bio}) = K_1 * C_{bio} * (V_{DD} - V_f - V_{T1} + \phi_{bio}) * (V_{DD} - V_{SS}) = K'_1 * C_{bio} * (V_1 + \phi_{bio})$, where $C_{bioB}$, $C_{bioA}$, $\phi_{bioB}$, and $\phi_{bioA}$, are the capacitance and work-function of the biofunctionalized gate before and after the biorecognition, respectively, results that the drain current variation due to the biorecognition event(s) results $\Delta I_D = I_D(C_{bioA}, \phi_{bioA}) - I_D(C_{bioB}, \phi_{bioB}) = K'_1 * [V_E * (C_{bioA} - C_{bioB}) + C_{bioA} * (\phi_{bioA} - \phi_{bioB})]$ where $V_E = V_1 + \phi_{bioB}$. Hence, after the biorecognition event(s) $\Delta V_0 = -$ $R_F{}^*\Delta I_D = R_F{}^*K'_1{}^*[V_E{}^*\Delta C_{bio} + C_{bioA}{}^*\phi_{bio}]$, where the amplification factors $R_F{}^*K'_1$ depend on the feedback (in the embodiment herein that is the transistor T2) and on the geometrical, material and technology of the biosensor (transistor T1 with the biofunctionalized gate 7, 106, 207A, 207B), respectively.

Figure 26:
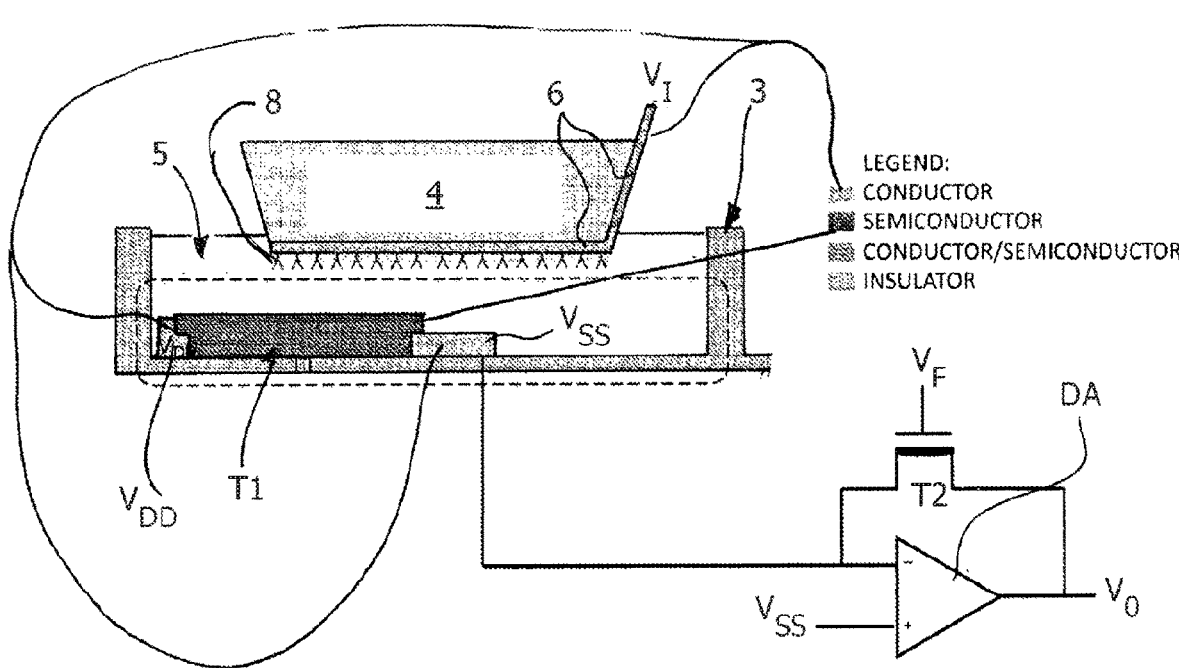

In the embodiment of FIG. 26, corresponding to the circuit layout of FIG. 25, each receptacle 5 include a single semiconductor pad (SEMICONDUCTOR) electrically connected to contact pads $V_{DD}$, $V'_{SS}$ made of conductor (electrically conductive) material. The contact pad $V'_{SS}$ is connected to the external electronic circuit EXT for amplification and signal conditioning. All of the components in the receptacle 5 are immersed, in use, in a gating electrolyte including a solution containing one or more species or substances to be detected by the biosensor BS.

Figures 27, 28:
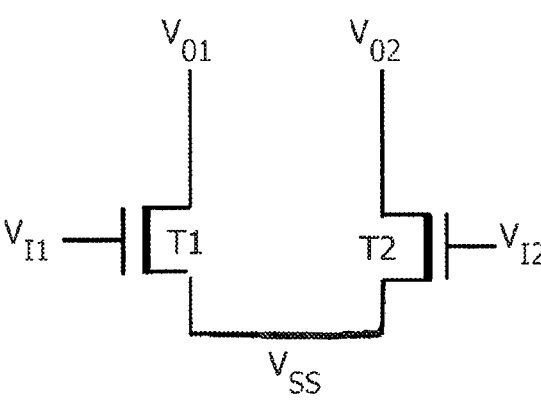

FIG. 27 shows yet a further possible embodiment of a biosensor BS of the system according to the invention. The transistors T1 and T2, both having a (respective) biofunctionalized gate, share the same source ($V_{SS}$) for common bias and each have a respective drain $V_{01}$ and $V_{02}$. The transistor T1 and T2 can be placed in two separated receptacles 5 containing different fluids (electrolytes). In a possible embodiment $V_{SS}$ is connected to a current generator while $V_{01}$ and $V_{02}$ can be connected to corresponding active loads (e.g. transistors operated in saturation region), thus forming a differential pair configuration. When $V_{f1}$ and $V_{f2}$ are biased at a suitable voltage the output signal $V_{01}$–$V_{02}$ is measured and it provides meaningful information about the bio-recognition events occurred at the two bio-functionalized gates.

In a possible application the two fluids filling the corresponding adjacent receptacles 6 can be different and one fluid contains the target analyte (i.e. the target specific-binding-pair-forming substance) while the other does not contain the target analyte. In this case, $V_{01}$–$V_{02}$ provides information on the specificity of the bio-recognition processes. In another possible application the two fluids filling the corresponding wells can be the same and, in this case, $V_{O1}$–$V_{O2}$ provides information on the variability of the bio-functionalization and bio-recognition processes.

In other embodiments the transistor T1 and T2 can have different bio-functionalized gates, viz. the bio-probes anchored on the gate can be different.

With reference to FIG. 28, which shows an embodiment corresponding to the circuit topology of FIG. 27, the biosensor BS according to FIG. 27 requires two adjacent receptacles 5 to be assembled and operated. While construction of the plate 3 is made in accordance with FIGS. 10 and 11, in this specific case the septum (or in general the receptacle wall) separating the two adjacent receptacles is provided with the sealant layer SL, so as to seal against the common pad $V_{SS}$.

With reference to FIG. 28, the leftmost receptacle 5 includes a first semiconductor pad made of a semiconductor material (SEMICONDUCTOR), while the rightmost pad 5 includes a second semiconductor pad (SEMICONDUCTOR) made of a semiconductor material (either different or the same as the material of the first pad).

Electrical contact pads $V_{01}$, $V_{SS}$, $V_{02}$ (left to right) are provided at the bottom of the receptacle 5, with the pad $V_{SS}$ extending through the two adjacent receptacles (the common pad $V_{SS}$ underlies the receptacle wall between the two adjacent receptacles) and covered by an insulator layer (INSULATOR), the contact pads having the following connection pattern:

the first semiconductor pad is electrically connected to the pads $V_{01}$, $V_{SS}$ the second semiconductor pad is connected to the pads $V_{SS}$ and $V_{02}$ The first semiconductor pad defines, together with the leftmost biofunctionalized gate electrode 6 (gate voltage $V_{01}$), the transistor T1. The second semiconductor pad defines, together with the rightmost biofunctionalized gate electrode 6 (gate voltage $V_{02}$), the transistor T2.

Figure 29:
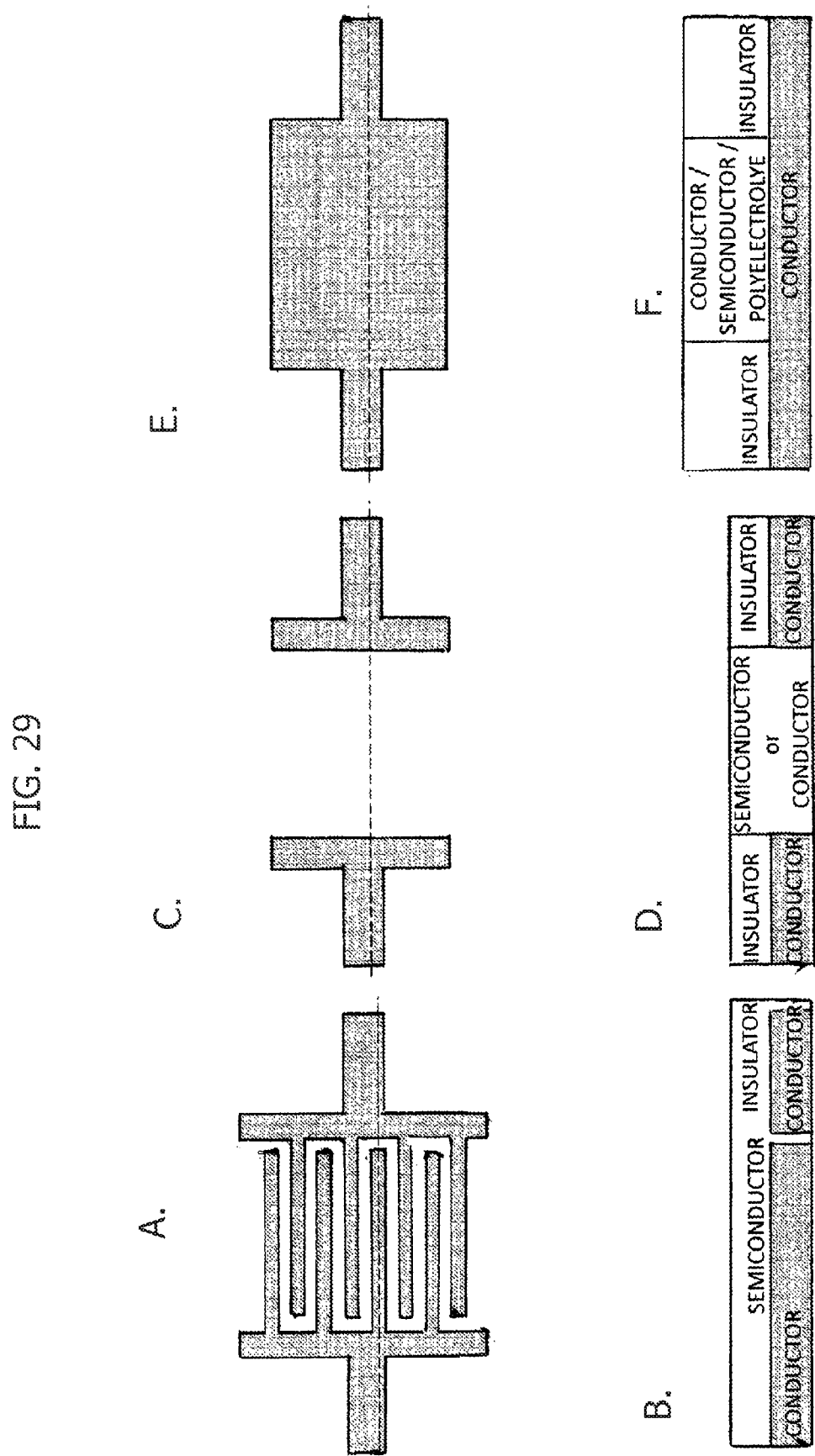
FIG. 29 shows various source-drain channel layouts according to various embodiments of the invention.

Each element of the biosensor array of the system 1, 100, 200 integrated in the bottom plate 3 can include one or more transistors and/or resistors and/or electrodes. Some preferred embodiments are shown in FIG. 29.

In an embodiment, the layout of transistor T1 is shown in FIGS. 29A-B, the layout of transistor T2 is showed in FIGS. 29C-F wherein the source-drain channel is shown in FIGS. 29C-D and the gate in FIGS. 29E-F.

Moreover, the source-drain channel and the gate (FIGS. 29C-F) are electrostatically coupled by means of an electrolyte (liquid, gel or solid-state) which is separated by the electrolyte of the bio-functionalized gate. In another embodiment the transistor T2 is a solid-state device, e.g. a field-effect thin-film transistor, where the gate is a conductor in front of the channel semiconducting region. The gate and channel regions are spatially separated by a thin dielectric layer, which electrostatically couples the gate and the channel. In another embodiment, the transistor T2 can be embedded into the external circuitry used for reading and addressing each element of the biosensor matrix of the system 1, 100, 200.

FIGS. 29A-B show the top view and cross-section of an interdigitated source-drain channel of a transistor biosensor BS of any of the systems 1, 100, 200.

The conductor is patterned in a multi-finger structure to improve the overall width of the transistor source-drain channel.

A semiconductor is deposited on the top of the multi-finger structure while the external connections of the conductor are covered by an electrical and ionic insulator. This prevents the flow of electrons and/or ions from/to the conductor to/from the electrolyte. Typically, the insulator has a low capacitance and protect the parts of the conductor electrodes which must not interact with the electrolyte solution and/or ions.

FIGS. 29 C-D show a top view and a cross-section of a single-channel transistor where the source-drain channel is a semiconducting or a conducting (e.g. a conductive polymer like PEDOT:PSS) material. In the cross-section shown in FIG. 29D the semiconductor or conductor is on top of the conductive electrodes but in another embodiment the structure could be—so to say—flipped, viz. the semiconductor or conductor is deposited as a first layer and then conductive electrodes is on top. As disclosed in the case of FIGS. 29A-B, an insulator layer can be used to cover the conductor electrodes in order to prevent direct contact thereof with the electrolyte.

FIGS. 29C-D show the top view and cross-section of a single-electrode which is partially covered with a conductor and/or a semiconductor and/or a polyelectrolyte. The remaining portions of the conductor are covered with an insulator suitable to prevent direct contact thereof with the electrolyte.

In addition to the foregoing, the systems 1, 100, 200 according to the invention lend themselves to be provided as kits according to the following (kit) embodiments.

In a first embodiment, the kit includes a first plate 2, 102, 202 with biofunctionalized gates 7, 207A, 207B and a second plate 3 with one or more transistors connected according to one or more transistors configurations of FIGS. 17-25. In a second embodiment, the kit corresponds to that of the first embodiment, and further includes an electrolyte (e.g. pure water) required for filling the receptacles 5, 205 of the plate 3.

In a third embodiment, the kit corresponds to that of the first embodiment and further includes a liquid intended for washing the gate electrodes 7, 207A, 207B after the incubation into the analyte of interest (e.g. phosphate buffer solution pH 7, ionic strength 150 mM or HPLC water).

In a fourth embodiment, the kit includes a first plate 2, 102, 202 provided with conductive electrodes (gates) functionalized only with the chemical layer (e.g. a chemical SAM layer), and a second plate with one or more transistors connected according to one or more transistors configurations of FIGS. 17-25.

In a fifth embodiment, kit corresponds to that of the fourth embodiment, and further includes one or more second plates 3 which could be, for instance, a standard plastic ELISA plate (e.g. a virgin polystyrene 96-wells plate) or a custom bottom plate with a single or multiple wells filled with the same or different fluids according to one of the methods disclosed herein.

In a sixth embodiment, the kit corresponds to that of the fifth embodiment and further includes a biofunctionalization kit comprising various fluids required for the individual incubations and washing steps of the gates.

For example, a kit according to the sixth embodiment could comprise the following:

i) a second plate 3 including a single receptacle 5, 205 or multiple receptacles 5, 205 filled with water or another buffer solution for washing the gates of the first plate 2, 102, 202. One or more washing steps have to be performed.

ii) a second plate 3 including a single well or multiple wells 5, 205 filled with a proper amount of solution with bio-probes (e.g. antibodies or DNA). An incubation step for a certain amount of time (e.g. few minutes) has to be performed.

iii) a second plate 3 including a single receptacle 5, 205 or multiple receptacles 5, 205 filled with water or another buffer for washing of the gates on the plate 2, 102 202. One or more washing steps have to be performed.

iv) a second plate 3 including a single receptacle or multiple receptacles filled with ethanolammine in a buffer solution or another chemical solution. An incubation step has to be performed.

v) a second plate 3 including a single receptacle 5 or multiple receptacles 5 filled with water or another buffer (e.g. PBS) for washing the gates on the first plate 2, 102, 202. One or more washing steps have to be performed.

vi) a second plate 3 including a single receptacle 5, 205 or multiple such receptacles with BSA or other biological solutions. An incubation step has to be performed.

vii) A bottom plate composed by a single well or multiwells filled with a proper amount of water or other buffer (e.g. PBS) for washing the gates on the top cover plate. —One or more washing steps have to be performed.

In a seventh embodiment, the kit includes a first plate 2, 102, 202 with bare conductive gates (e.g. only gold) and a second plate 3 with one or more transistors connected according to one or more transistors configurations in FIGS. 17-25.

In an eighth embodiment, the kit corresponds to that of the seventh embodiment and further includes one or more second plates 3 which could be a standard ELISA plate (e.g. a virgin polystyrene 96-wells plate) or a custom bottom plate with a single receptacle 5 or multiple receptacles 5 filled with the same or different fluids according to one of the methods disclosed herein.

In a ninth embodiment, the kit corresponds to that of the eighth embodiment and further includes a chemical functionalization kit and a biofunctionalization kit made of various fluids required for the various incubation and washing steps.

By way of example, a chemical functionalization kit within the above meaning could comprise the following steps and fluids:

a) a second plate 3 including a single receptacle 5, 205 or multiple receptacles 5, 205 filled with a chemical SAM (e.g. 3-MPA:11-MUA 10:1). An incubation step has to be performed.

b) second plate 3 including a single receptacle 5, 205 or multiple receptacles 5, 205 dilled with a solvent or a liquid (e.g. ethanol or water) for washing the gates on the top cover plate. —One or more washing steps have to be performed.

c) a second plate 3 including a single receptacle 5, 205 or multiple receptacles 5, 205 filled with an activation liquid (EDC-NHS solution). An incubation step has to be performed.

d) a second plate 3 including a single receptacle 5, 205 or multiple receptacles 5, 205 filled with a solvent or a liquid (e.g. ethanol or water or PBS) for washing the gates on the top cover plate. —One or more washing steps have to be performed.

A biofunctionalization kit could also comprise the steps and fluids mentioned above under items i)-vii)

Preferably, all of the aforementioned kits are to be used with a machine suitable for the mechanical handling of the first plate 2, 102, 202, the second plate 3, and fluids. Moreover, the same machine may include the electronic circuits, sockets, software and components required to bias, read, address, and conditioning the biosensors BS matrix including the first and second plates. Naturally, while the principle of the invention remains the same, the details of construction and the embodiments may widely vary with respect to what has been described and illustrated purely by way of example, without departing from the scope of the present invention.

The invention claimed is:

1. A system for biological assay including:
a first plate comprising a plurality of protrusions,
a second plate configured for mating with said first plate, the second plate comprising a plurality of receptacles, each receptacle being configured to receive at least a portion of a corresponding one of said protrusions upon mating of the first plate with the second plate,
wherein each protrusion comprises a gate electrode configured for facing the respective receptacle upon mating of the first plate with the second plate,
wherein each receptacle further includes at least one source-drain channel operatively associated to a gate electrode carried by a respective protrusion upon mating of the first plate with the second plate.

2. The system of claim 1, wherein the protrusions are frustoconical in shape.

3. The system of claim 1, wherein the gate electrode on each protrusion is applied to an end surface of each protrusion.

4. The system of claim 1, wherein the first plate includes column-wise series connections of gate electrodes, each series connection ending with a read-out pad configured for contacting a read-out terminal of a read-out electronics facility.

5. The system of claim 1, wherein each gate electrode is functionalized with a layer of biological recognition elements comprising one or more specific-binding-pair-forming substances, the layer of biological recognition elements being exposed to the at least one source-drain channel in a corresponding receptacle upon the mating of the first plate and the second plate, thereby defining each a biosensor, and wherein the second plate is configured to receive one or more gating electrolytes in the receptacles thereof for assay by means of said biosensors.

6. The system of claim 5, wherein the layer of biological recognition elements is identical for each gate electrode.

7. The system of claim 5, wherein the specific-binding-pair-forming substances of the layer of biological recognition elements of at least one group of gate electrodes is different from the specific-binding-pair-forming substances of the layer of biological recognition elements of another group of gate electrodes.

8. The system of claim 5, wherein the second plate comprises a matrix of through receptacles configured for mating with a board carrying, for each receptacle, the at least one source-drain channel operatively associated to a gate electrode carried by a respective protrusion of the first plate.

9. The system of claim 8, wherein the board includes a sealant layer, the sealant layer having a pattern that mirrors a footprint of the matrix of through receptacles.

10. The system of claim 8, wherein the at least one source-drain channel includes a first source-drain channel and a second source-drain channel, wherein the biosensor includes the first source-drain channel and the second source-drain channel, each having a respective gate electrode functionalized with the layer of biological recognition elements comprising the one or more specific-binding-pair-forming substances, the first source-drain channel and the second source-drain channel share the same source and each have a respective drain.

11. The system of claim 10, wherein the first source-drain channel is configured to be connected to a reference voltage, while the drain of the first source-drain channel is connected to a negative input of a current-voltage amplifier converter included in readout electronics.

12. The system of claim 10, wherein the biosensor includes two adjacent receptacles with a receptacle wall separating the two adjacent receptacles provided with a sealant layer, so as to seal against a common pad defining the source shared between the first source-drain channel and the second source-drain channel, the common pad underlying the receptacle wall.

13. The system of claim 12, wherein a first receptacle of said two adjacent receptacles includes a first semiconductor pad made of a first semiconductor material, and a second receptacle of said two adjacent receptacles includes a second semiconductor pad made of a second semiconductor material.

14. The system of claim 13, wherein electrical contact pads are provided at a bottom of the two adjacent receptacles, with the common pad extending through the two adjacent receptacles and covered by an insulator layer, the contact pads having the following connection pattern: the first semiconductor pad is electrically connected to a first drain pad and said common pad, and the second semiconductor pad is connected to the common pad and a second drain pad.

15. The system of claim 14, wherein said two adjacent receptacles contain different fluids, one of which includes a target specific-binding-pair-forming substance, wherein a difference in voltage between the second drain pad and the first drain pad provides information as to a biological recognition process.

16. The system of claim 14, wherein said two adjacent receptacles contain one and the same fluid, wherein a difference in voltage between the second drain pad and the first drain pad provides information on a variability of bio-functionalization.

17. The system of claim 1, wherein each gate electrode is arranged at an end surface of a corresponding protrusion.

18. The system of claim 17, wherein the protrusions are integral with the first plate.

19. The system of claim 17, wherein the protrusions are provided as electrically conductive foil members sticking out of a surface of the first plate.

20. The system of claim 19, wherein the electrically conductive foil members provide the gate electrodes of the system.

21. The system of claim 1, wherein each gate electrode is deposited on an end surface of a respective protrusion and at least partially on a lateral surface thereof, so as to electrically connect a portion provided at the end surface with a conductive material leading out of a through hole associated to the same protrusion and with a contact pad provided on a side of the first plate opposite to the protrusions.

22. The system of claim 21, wherein each protrusion is further provided with a protective layer on the lateral surface thereof, above the conductive material of the gate electrode.

23. The system of claim 1, wherein the at least one source-drain channel includes a first source-drain channel and a second source-drain channel, and wherein each receptacle includes the first source-drain channel, and the second source-drain channel.

24. The system of claim 23, wherein the first source-drain channel and the second source-drain channel in each receptacle are gated by one and the same gate electrode upon the mating of the first and second plates, thereby defining an array of biosensors, wherein the second plate is configured to receive one or more gating electrolytes in the receptacle thereof for assay by means of said biosensors.

25. The system of claim 23, wherein the first source-drain channel comprises a semiconductor material, and wherein the second source-drain channel comprises a conductor material.

26. The system of claim 25, wherein the first source-drain channel comprises an interdigitated electrically conductive pattern between source and drain contacts, and wherein the semiconductor material is stacked on top of an interdigitated electrically conductive pattern.

* * * * *